US008417061B2

(12) United States Patent
Kennedy et al.

(10) Patent No.: US 8,417,061 B2
(45) Date of Patent: Apr. 9, 2013

(54) METHODS AND SYSTEMS FOR PROVISIONING ENERGY SYSTEMS

(75) Inventors: Daniel Ian Kennedy, Berkeley, CA (US); Adam Pryor, Paddington NSW (AU); Andrew Birch, Ourca, CA (US)

(73) Assignee: Sungevity Inc., Oakland, CA (US)

( * ) Notice: Subject to any disclaimer, the term of this patent is extended or adjusted under 35 U.S.C. 154(b) by 925 days.

(21) Appl. No.: 12/364,506

(22) Filed: Feb. 2, 2009

(65) Prior Publication Data

US 2009/0304227 A1 Dec. 10, 2009

Related U.S. Application Data

(60) Provisional application No. 61/025,431, filed on Feb. 1, 2008, provisional application No. 61/047,086, filed on Apr. 22, 2008.

(51) Int. Cl.
*G06K 9/32* (2006.01)

(52) U.S. Cl. ........ 382/286; 382/282; 382/291; 382/307; 703/1; 703/2

(58) Field of Classification Search .................. 382/282, 382/291, 307; 703/1, 2
See application file for complete search history.

(56) References Cited

U.S. PATENT DOCUMENTS

| | | | | |
|---|---|---|---|---|
| 6,047,274 | A | 4/2000 | Johnson | |
| 6,546,535 | B1 | 4/2003 | Nagao | |
| 6,549,200 | B1 | 4/2003 | Mortlock | |
| 6,875,914 | B2 | 4/2005 | Guha | |
| 7,133,551 | B2 * | 11/2006 | Chen et al. | 382/154 |
| 7,238,879 | B2 | 7/2007 | Matsushita | |
| 7,303,788 | B2 | 12/2007 | Kataoka | |
| 7,324,666 | B2 * | 1/2008 | Zoken et al. | 382/113 |
| 7,343,268 | B2 * | 3/2008 | Kishikawa | 703/1 |
| 7,529,794 | B2 * | 5/2009 | Dorai et al. | 709/204 |
| 7,534,956 | B2 | 5/2009 | Kataoka | |
| 7,733,342 | B2 * | 6/2010 | Kim et al. | 345/426 |

(Continued)

FOREIGN PATENT DOCUMENTS

| | | |
|---|---|---|
| JP | 2001209680 | 8/2001 |
| JP | 2001229262 | 8/2001 |
| WO | WO-2007127864 A2 | 8/2007 |

OTHER PUBLICATIONS

Olivier Faugeras and Quang-Tuan Luong, "The Geometry of Multiple Images", book, 2001, pp. 8,9,388,389,578,579, Massachusetts Institute of Technology, USA.

(Continued)

*Primary Examiner* — Yosef Kassa
(74) *Attorney, Agent, or Firm* — Patrick M. Reilly

(57) ABSTRACT

The invention provides consumers, private enterprises, government agencies, contractors and third party vendors with tools and resources for gathering site specific information related to purchase and installation of energy systems. A system according to one embodiment of the invention remotely determines the measurements of a roof. An exemplary system comprises a computer including an input means, a display means and a working memory. An aerial image file database contains a plurality of aerial images of roofs of buildings in a selected region. A roof estimating software program receives location information of a building in the selected region and then presents the aerial image files showing roof sections of building located at the location information. Some embodiments of the system include a sizing tool for determining the size, geometry, and pitch of the roof sections of a building being displayed.

4 Claims, 19 Drawing Sheets

U.S. PATENT DOCUMENTS

| | | | | |
|---|---|---|---|---|
| 7,749,351 | B2 | 7/2010 | Kataoka | |
| 7,787,659 | B2 * | 8/2010 | Schultz et al. | 382/106 |
| 7,844,499 | B2 | 11/2010 | Yahiro | |
| 7,873,239 | B2 * | 1/2011 | Yamaai | 382/289 |
| 7,991,226 | B2 * | 8/2011 | Schultz et al. | 382/167 |
| 8,078,436 | B2 * | 12/2011 | Pershing et al. | 703/2 |
| 2004/0153371 | A1 | 8/2004 | Razumov | |
| 2006/0061566 | A1 | 3/2006 | Verma | |
| 2006/0265287 | A1 | 11/2006 | Kubo | |
| 2007/0150198 | A1 | 6/2007 | MacDonald | |
| 2007/0150366 | A1 | 6/2007 | Yahiro | |
| 2008/0262789 | A1 | 10/2008 | Pershing | |
| 2009/0132436 | A1 | 5/2009 | Pershing | |
| 2009/0234692 | A1 | 9/2009 | Powell | |
| 2010/0110074 | A1 | 5/2010 | Pershing | |
| 2010/0114537 | A1 | 5/2010 | Pershing | |
| 2010/0217724 | A1 | 8/2010 | Wayne | |
| 2011/0016017 | A1 | 1/2011 | Carlin | |
| 2011/0047048 | A1 | 2/2011 | Yahiro | |

OTHER PUBLICATIONS

Oliver Faugeras “The Geometry of Multiple Images” 2001 United States ISBN 0-262-06220-8.

Bartesaghi, Alberto, Three-dimensional shape rendering from multiple images, Graphical Models 2005 pp. 1-15, Elsevier, online at www.science direct.com.

Hudson, Thomas R., ‘Merging VRML Models: Extending the Use of Photomodeller’ Mar. 23, 1998, Thesis, School of Engineering and Applied Science, University of Virginia.

* cited by examiner

FIG. 10
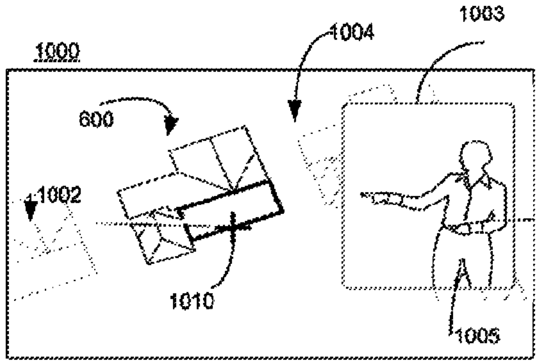
FIG. 11
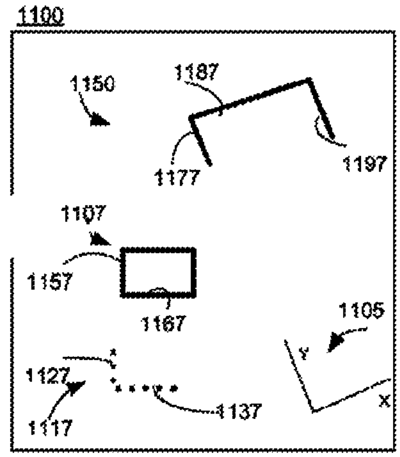
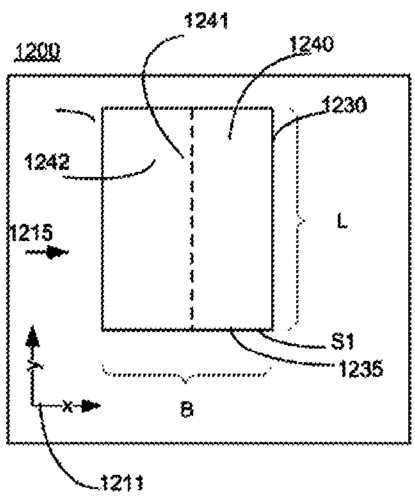
FIG. 12
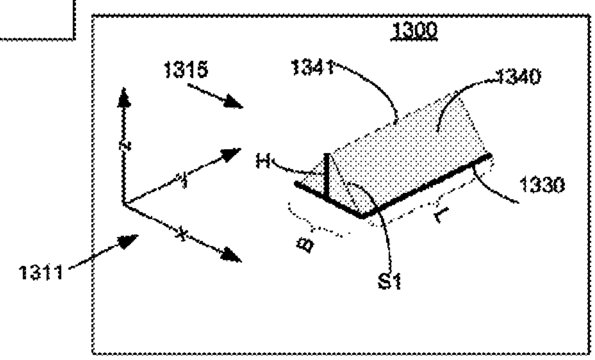
FIG. 13

METHODS AND SYSTEMS FOR PROVISIONING ENERGY SYSTEMS

CROSS REFERENCE TO RELATED APPLICATIONS

This application claims the benefit of filing date of U.S. provisional application Ser. No. 61/025,431 titled "System and Method for Sizing a Roof for Installation of Solar Panels", naming the same inventors and filed on Feb. 1, 2008 in the USPTO, the specification of which is incorporated herein, in its entirety, by reference. This application claims the benefit of PCT/US08/79003 filed Oct. 6, 2008 in the PCT receiving office of the USPTO, naming the same inventors, the specification of which is hereby incorporated herein, in its entirety, by reference. This application claims benefit of filing date of U.S. provisional application Ser. No. 61/047,086 titled Customer Relationship Management Module, Marketing Module, Quick Sizing filed on Apr. 22, 2008 in the USPTO, naming the same inventors, the specification of which is incorporated herein, in its entirety, by reference.

FIELD OF THE INVENTION

The present invention relates generally to methods and systems for provisioning energy systems and in particular to methods and systems for provisioning solar energy systems.

BACKGROUND OF THE INVENTION

Environmental and cost concerns associated with traditional energy systems are increasing in today's energy conscious society. Concerns about oil and natural gas prices, and environmental concerns highlighted by recent hurricanes and other natural disasters have focused attention on alternative energy sources and systems.

So called 'clean energy' offers much hope for alleviating today's energy concerns. For example, today's solar technologies provide significant economic and environmental advantages for homeowners. Deployment of solar technologies is widely encouraged through financial incentives offered by local, regional as well as federal energy rebate programs.

Yet, despite these advantages and incentives many homeowners remain reluctant to convert from conventional fuel based systems to advanced solar and other alternative energy technologies. Part of the reluctance stems from the time, expertise and cost associated with converting from a conventional energy system to an alternative energy system such as a solar energy system. The current marketplace does not offer consumers sufficient information about costs and benefits of energy systems to allow a potential purchaser to make an informed choice when considering alternative energy systems.

For example, sizing a homeowner's particular roof-space including all the relevant features of that particular roof space typically requires an on-site visit by a technician. Further, it is presently not possible to remotely evaluate shading issues or other local factors that might impact the performance of a particular system. Nor is it possible for potential purchasers to visualize a system as it would appear installed on the purchaser's actual roof. As a result, information available to a purchaser about engineering requirements, aesthetic results, cost and environmental impact of a system considered for purchase is limited.

What are needed are systems and methods that provide consumers, contractors, third party vendors and others with convenient, comprehensive and site-specific information for use in provisioning a site with a solar energy system. Further needed are systems and methods that provide a potential purchaser with site specific information related to energy system costs, benefits and aesthetics of alternative energy systems.

SUMMARY OF THE INVENTION

The invention provides consumers, private enterprises, government agencies, contractors and third party vendors with tools and resources for gathering site specific information related to purchase and installation of energy systems.

DESCRIPTION OF THE DRAWING FIGURES

These and other objects, features and advantages of the invention will be apparent from a consideration of the following detailed description of the invention considered in conjunction with the drawing figures, in which:

FIG. 10 illustrates a viewport displaying an image of an installation surface according to an embodiment of the invention.

FIG. 11 is a viewport displaying a top plan view of an installation surface and including a measuring tool according to an embodiment of the invention.

FIG. 12 is a viewport displaying a top plan view of the measuring tool illustrated in FIG. 11.

FIG. 13 is a perspective view of the roof illustrated in FIG. 11.

DETAILED DESCRIPTION OF THE INVENTION—PROVISIONING SYSTEMS AND METHODS

Definitions

The term "PV cell" refers to a photovoltaic cell, also referred to as solar cell.

The terms "PV Module" and "solar panel" and 'solar tile' refer to various arrangements of interconnected assemblies of photovoltaic cells.

The term "PV Array" refers to a plurality of interconnected solar panels or tiles.

The term 'provisioning' refers to providing, supplying, equipping, installing, or preparing to provide, supply, equip or install energy systems and energy system components for delivering energy to a site.

Figure 1:
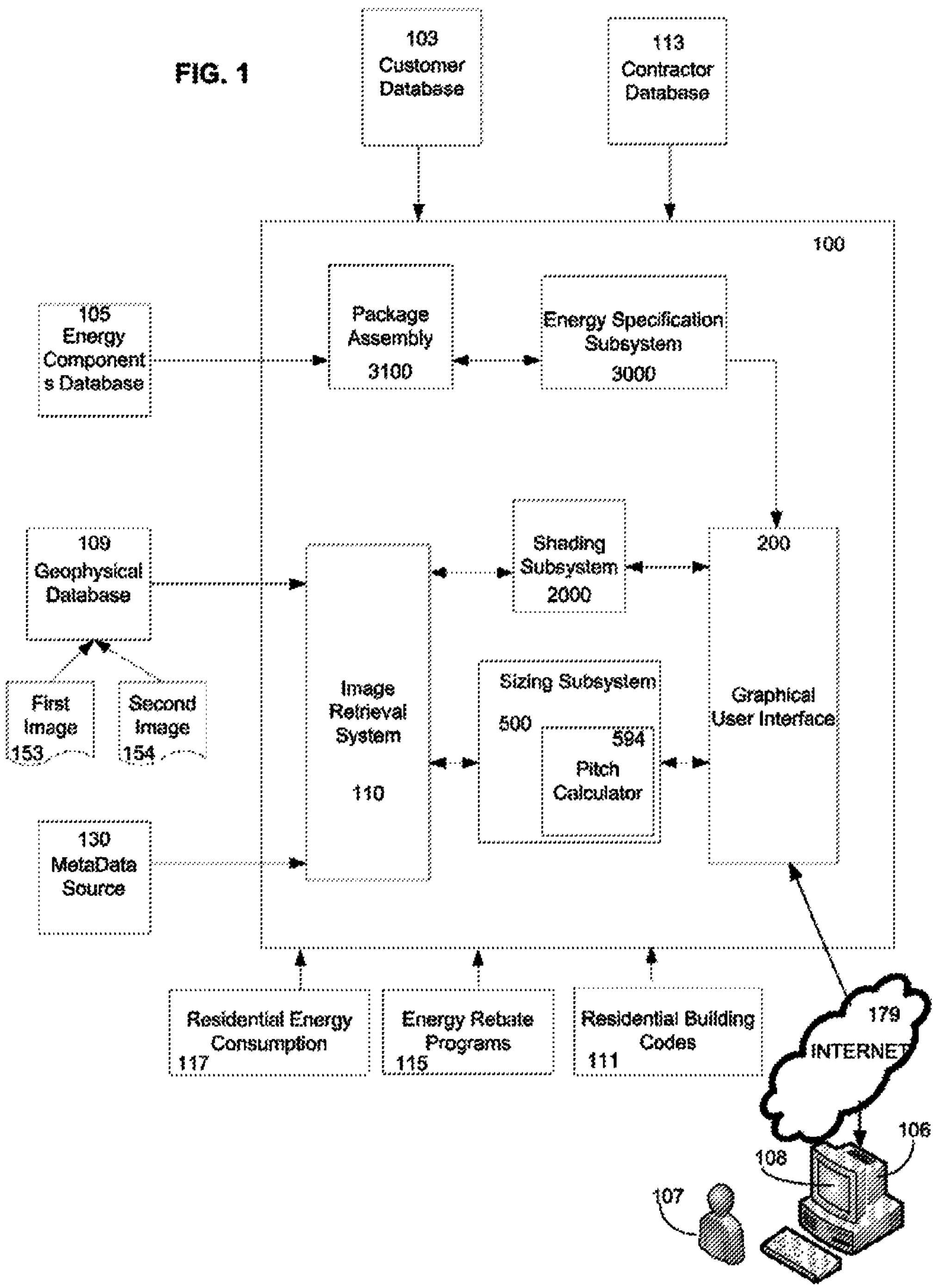
FIG. 1 is a high level block diagram illustrating a system for provisioning energy systems according to an embodiment of the invention.

FIG. 1 Provisioning System

FIG. 1 illustrates a provisioning system 100 according to an embodiment of the invention. System 100 and methods of the invention will find application in provisioning energy systems, for example, solar energy systems and other alternative energy systems. Solar energy systems include off-grid systems and grid tie systems. Off grid systems include stand-alone systems designed for homes, recreational vehicles, cabins, and backup and portable power applications. Systems and methods of the invention are also suitable for provisioning grid-tie systems. Further embodiments of the invention are suitable for provisioning hybrid off-grid systems, including systems integrating gasoline, propane or diesel generator power sources with other energy systems.

System 100 enables a user, for example user 107, to undertake efficient, cost effective and accurate execution of numerous phases of an energy system provisioning processes without the need for visits to the site to be provisioned. For example system 100 provides a tool for measuring a user selected roof or other user-selected other installation surface. One embodiment of the invention provides a sizing system for determining solar photovoltaic (PV) potential of a user selected installation site. System 100 matches user selected roof space and energy needs to commercially available system components without the need for visits to the user selected installation site by a technician or engineer.

System 100 comprises a graphical user interface module 200 and at least one of an energy specification subsystem 3000, a sizing subsystem 500 including a pitch calculator 594, a shading subsystem 2000, an image retrieval subsystem 110 and a package assembly subsystem 3100. Various embodiments of system 100 are configured to further communicate with at least one of a plurality of energy system related databases, for example, contractor database 113, customer database 103, energy components database 105, metadata source 130, residential energy consumption information database 117, energy rebate program information database 115 and residential building code database 111.

Embodiments of system 100 as disclosed and enabled herein are implementable using commercially available hardware. For example a commercially available processor or computer system adapted in accordance with the teachings herein implements system 100 including at least one of subsystems 110, 2000, 3000, 3100, 500 and/or 200. For example, one of ordinary skill in the art will recognize upon reading this specification, that commercially available processors, memory modules, input/output ports and other commercially available hardware components are suitable for use in constructing embodiments of system 100. These may be assembled as taught in this specification to arrive at the various embodiments.

Further, the teachings contained in this specification are implementable in a variety of combinations of hardware and software components. Where appropriate, flowcharts and detailed descriptions are provided herein to enable one of ordinary skill in the art to implement the features and functions of embodiments of the invention. In addition, some embodiments of the invention are configured for communication between system 100 and databases 111-130 via wired or wireless Internet or other network communication links. Other embodiments of the invention are configured for wireless or wired internet communication between subsystems of system 100.

Graphical User Interface (GUI) 200

System 100 implements a graphical user interface unit 200 (GUI unit) that enables a user 107 to interact with system 100 and its subsystems. According to some embodiments of the invention GUI 200 is implemented by a server providing a website and serving interactive web pages for gathering information and providing calculation results, images and other energy system information to user 107.

Figure 2:
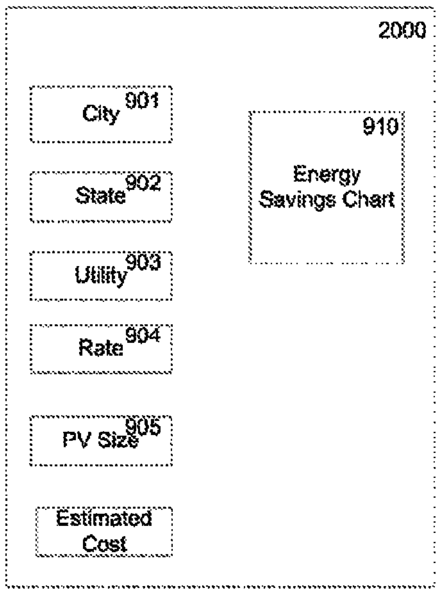
FIG. 2 illustrates a Graphical User Interface (GUI) for displaying energy system information to a user.
Figure 3:
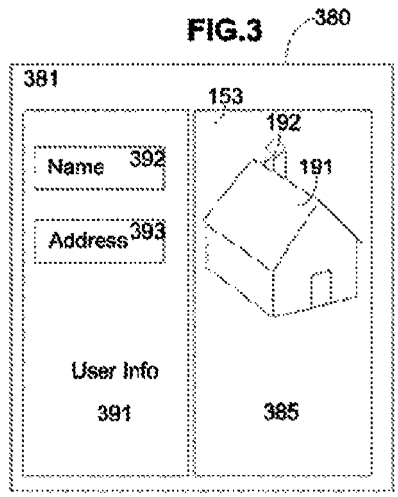
FIG. 3 is GUI enabling a user to provide address information for an installation site.
Figure 4:
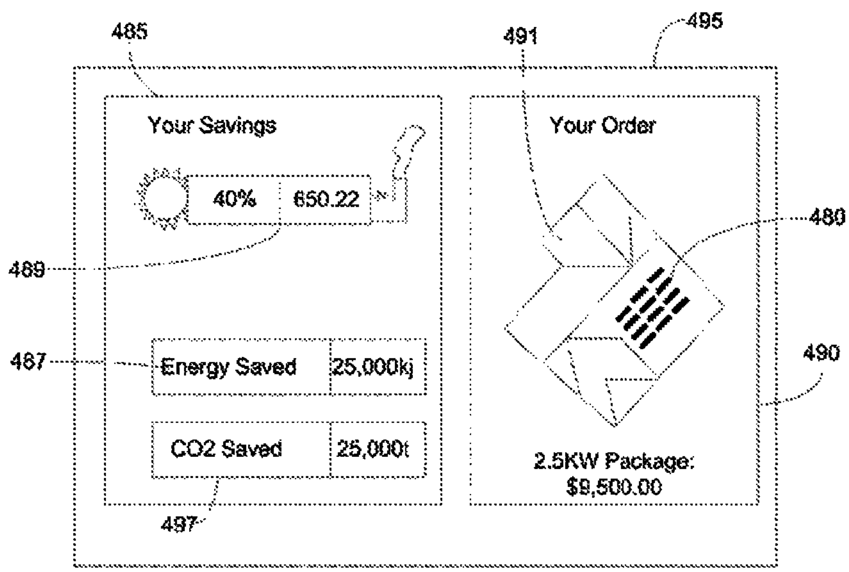
FIG. 4 illustrates a display screen providing a graphical indication of energy savings and an image of a solar energy system installed on a user specified installation surface according to one embodiment of the invention.

FIGS. 2 and 3 illustrate examples of an information presentation GUI 2000 and an information gathering GUI 380, respectively. GUIs 2000 and 380 are generated by GUI unit 200 for presentation on a display device 108 of a user system 106 (best illustrated in FIG. 1). For example, display device 108 displays GUI 380 to user 107. At least a portion 381 of display screen 380 is configured to receive user information, for example, site location information from user 107. User 107 provides the information by entering the information via, for example, a keyboard of system 106.

System 100 receives user provided information related to location of a site to be provisioned with solar energy capability. GUI 200 provides the received user information to an image retrieval subsystem of system 100. According to the embodiment illustrated in FIG. 1, GUI 200 provides the received user information to a sizing subsystem 500 of system 100. Sizing subsystem 500, in turn provides the information to image retrieval subsystem 110.

In alternative embodiments of the invention, location information received from user system 106 is provided directly to image retrieval subsystem 110. In either configuration, system 100 uses the location information received from user system 106 to retrieve an image 153 of the location (or site) from a geophysical database 109. In response to receiving the location information, system 100 provides an image corresponding to the location, for example an image of a roof of a house 391 for display on screen 380 of display device 108 of a user system 106.

Embodiments of system 100 enable a user 107 to interact with system 100 to determine, at least partly automatically, information related to size of an installation area of a site. FIG. 2 illustrates a GUI 381 as displayed on a display screen 380 of a display device 108 of a user system 106. GUI 381 enables user 107 to provide location information, for example, address 393 of a user-selected site via user system 106. The information is transmitted via a communications link, for example the Internet 107 and received by system 100. In response to receiving the location information, system 100 retrieves an image of the location from a source of images such as geophysical database 109. System 100 provides a retrieved image 153 of the user selected site based on the location information provided by the user.

In one embodiment of the invention, a graphical user interface (best illustrated in FIGS. 8-9) cooperates with sizing subsystem 500 of system 100 to implement a sizing tool enabling user 107 to determine surface dimensions and pitch of a surface, for example a roof 191 of a house appearing in the retrieved image 153. Thus there is no need to physically visit the installation site to make measurements and perform sizing calculations.

Image Retrieval Subsystem 110

Returning now to FIG. 1 an image retrieval subsystem 110 communicates with a source of images 109. As used herein the term 'images' refers to photographic images and also to data and electrical signals representing photographic image information. The term 'images' also refers to data comprising other types of images such as still video images, video frames and fields of motion video images. A variety of image types and formats are suitable for use in system 100. Suitable image formats include standard file formats containing satellite or aerial photography (such as JPG, GIF, PNG etc) and also images served through a tile-server, whereby a single image is broken into multiple tiles which are joined to form the full image. Furthermore, these images may also be generated from other data sources, such as vector shapes, 3D (CAD) files and others rather than satellite or aerial photography.

In one embodiment of the invention more than one source of images is provided to system 100 and used to determine roof size and pitch. For example, in one embodiment of the invention user 107 employs an image capture device embedded in, for example, a cellular telephone, to capture an image of roof 191. The image captured by the image capture device is then transmitted by user 107 to system 100 via Internet 179, or via cellular, satellite, radio frequency or other transmission means. In that case, system 100 determines at least one of roof size, pitch and shading based in part on the user-captured image and at least in part on at least one image retrieved from an image database such as geophysical database 109.

In one embodiment of the invention source of images 109 comprises a geographical image database providing, for example, images 153 and 154. In one embodiment of the invention images 153 and 154 comprise digital data corresponding to images comprising satellite photographs. In some embodiments of the invention images 153 and 154 comprise images uploaded to source 109 by a third party, for example, a homeowner, a site manager, and images otherwise provided to source 109 by a user of system 100. In other embodiments of the invention, sources of images 109 include locally stored images.

In one embodiment of the invention images of geographic regions comprising potential sites to be provisioned with an energy system are obtained, for example, by satellite or aerial photography. The images are coded using image geo-coding software and stored in a memory, for example geographical database 109. Geo coding refers to a process of finding associated geographic coordinates (typically expressed as latitude and longitude) from other geographic data, such as street addresses, or zip codes. With geographic coordinates the features can be mapped and entered into Geographic Information Systems, or the coordinates can be embedded into media such as digital photographs via geo tagging.

Reverse Geo coding refers to finding an associated textual location such as a street address, based on geographic coordinates. A geo coder is software or a (web) service that implements this process. Some embodiments of the invention rely on a reverse geo coder to obtaining site addresses based on geographic coordinates. The geographic coordinates are determined, for example, by examining geo coded images including sites of interest for provisioning energy systems. One embodiment of the invention employs a Geographic Information Service (GIS) such as Google Earth™ comprising image source 109.

In one example embodiment of the invention image source 109 includes an image of a site considered for provisioning with an energy system wherein the site comprises at least one building structure, e.g., a house. The at least one image of the site represents a plan view, for example a top or bottom plan view, of a roof of the building. In some embodiments of the invention image source 109 includes at least one perspective image of a roof for installation of a solar energy system. In an example embodiment image retrieval subsystem 110 is configured to receive a first image 153 comprising a plan view of the roof and a second image 154 comprising a perspective view of the roof.

Sizing Subsystem 500—Pitch Calculator 594

System 100 includes a sizing subsystem 500 including a pitch calculator 594. Sizing subsystem 500 is coupled for communication with image retrieval subsystem 110 and GUI 200. Image retrieval subsystem 110 is coupled for communication, for example, via the Internet 179, with a least one source of images 109. Image retrieval module 110 is configured to provide at least one image 153 of a site to be provisioned.

GUI 200 cooperates with sizing subsystem 500 to implement a sizing tool enabling user 107 to determine surface dimensions and pitch of a surface without the need to physically visit the installation site to make measurements and perform sizing calculations. In response to receiving user information data, geophysical data including at least one image is downloaded from a source of geophysical data 109. The downloaded geophysical information is selected based on information provided by the user. For example, in the case wherein user 107 is a customer considering purchase of an energy system, user-provided information includes, for example, an address of a home to be provisioned with an energy system. In that case, an image of the user's home, including a view of the user's roof is downloaded from source of images 109. In one embodiment of the invention system 100 provides at least a portion of the downloaded image for display to user 107 on a display device 108 of a user's system 106.

User 107 interacts with system 100 and sizing subsystem 500 via GUI 200 to measure portions installation areas included in displayed images. The measurements are provided to a pitch calculator 294. Pitch calculator 294 determines pitch of a surface, for example, roof pitch, based on the image measurements made by user 107. Alternative embodiments of the invention determine pitch of other installation surfaces, for example, installation platforms not associated with a building and ground based installation surfaces based on measurements made automatically by sizing subsystem 500.

Shading Subsystem 2000

In one embodiment of the invention image retrieval subsystem 110 provides at least one downloaded image 153, 154 to shading subsystem 2000. In one embodiment of the invention shading subsystem 2000 communicates with user system 106 via GUI 200 to enable user 107 to interact with the downloaded image to identify shading objects impacting sun access of an installation surface. In other embodiments of the invention user interaction is not relied upon to identify shading objects. Instead, system 100 implements image analysis techniques to identify shadows in an image and to generate shading data based on the shadow information in the image.

Energy Specification Subsystem

An energy specification subsystem 3000 is coupled for communication with sizing subsystem 200. In some embodiments of the invention energy specification subsystem 3000 is further coupled for communication with shading subsystem 500. Energy specification subsystem 3000 receives sizing information from sizing subsystem 500. In some embodiments of the invention energy specification subsystem 3000 receives shading information from shading subsystem 2000. Energy specification subsystem provides energy system specifications for a site represented in a downloaded image based on the sizing and shade information.

In some embodiments of the invention, energy specification subsystem 300 is coupled for communication with a package assembly module 400. Package assembly module 400 is coupled for communication with a source of energy system component information, for example, an energy components database 105.

Package Assembly Module 3100

Package assembly module 3100 is configured to communicate with at least one of a component database 105 and a rebate program database 115. Package assembly module includes calculator module (not shown). Package assembly module generates at least one package comprising solar energy components suitable for installation at the consumer's site. To do this, package assembly module evaluates at least some of the following information: information about energy to be supplied by a solar energy system provided by sizing module 500; results of roof pitch, roof area, shading and other calculations.

Package assembly module 3100 communicates with component database 105 to determine suitable component selections to comprise package offerings for the consumer. Package assembly module obtains information about component prices and availability from database 105. Based on this information package assembly module 3100 generates at least one package comprising suitable components for a solar energy system for the consumer's site. Information about the package, including price information, is provided by package assembly module 3100 to consumer system 106 via user interface module 200. The information is displayed on a consumer display 106 to allow the consumer to select a package for purchase. Package assembly module receives the consumer's package selection.

External Databases

System 100 comprises system interfaces for communicating with external databases and sources of information relating to energy systems. For example, embodiments of the invention are configured to communicate with and receive data from geophysical database 109, residential energy consumption database 117, energy rebate database 115 and building code database 111

Some embodiments of the invention include a contractor database 113. In that case, contractor database 113 stores information, including for example, contractor location, qualifications, availability etc. related to contractors and installation support personnel. In that manner some embodiments of system 100 enable a user 107 to interact with GUI 200 to select a contractor to install an energy system procured using system 100. According to an embodiment of the invention solar energy system installers, for example, electricians or electrical contractors are provided with on line training in sales, customer service and system maintenance. Some embodiments of the invention include a capability to automatically dispatch trained installers and sales personnel to customer's homes when a customer requests a face-to-face discussion.

After an installation is completed, some embodiments of systems and methods of the invention store a customer's information in customer database 103. According to some embodiments of the invention an internet connection to a wireless output of a customer's energy inverter (for example equipped with a meter) will gather, analyze and display an installed energy system output and savings (financial and environmental). According to some embodiments of the invention recurring and on-demand site visits are automatically scheduled to maintain, clean and service a customer's system after an installation.

Information related to rebates for using alternative energy platforms is provided by energy rebate program database 115.

In that case system 100 communicates with database 115 to factor financial incentives into cost calculations for a specific user selected site.

Thereby embodiments of the invention provide direct selling, remote automatic sizing and delivery of energy systems. The invention further provides methods that decrease the cost and increase the ease by which customers' access energy system information.

Figure 27:
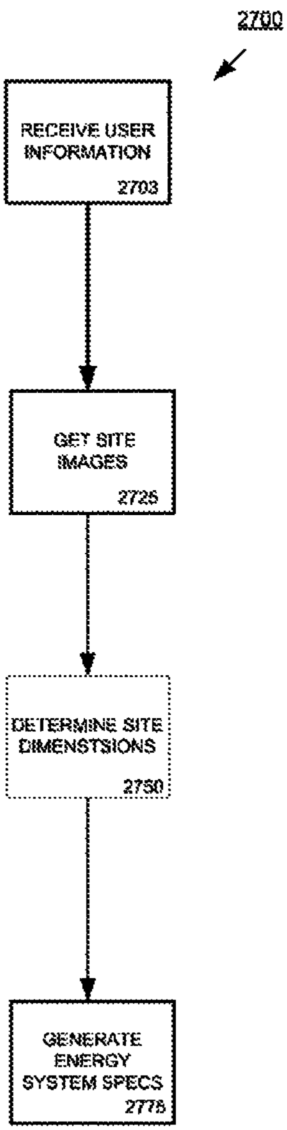
FIG. 27 is a flowchart illustrating steps of a method for generating energy system specifications according to an embodiment of the invention.

FIG. 27 is a flowchart illustrating steps of a method for provisioning energy systems according to an embodiment of the invention. At step 2703 Information about a site to be provisioned is received. In one embodiment of the invention a user, for example, a potential purchaser of an energy system, accesses a website implementing a system and method of the invention using, for example, a personal computer. A webpage of the website prompts the user to provide information to be used for provisioning a solar energy system to the user.

In one embodiment of the invention information about a site is received from a user, for example a homeowner, who may be considering installation of a solar energy system on a roof of a home. In other embodiments of the invention information about a site to be provisioned is provided by a vendor, an agent a commercial planner or other party desiring information about energy systems for a site. Examples of information received at step 2703 for a user/homeowner include such data as zip code, age of the home, square footage of the home, number of occupants and energy bill totals for a consecutive 12-month period. Various embodiments of systems and methods of the invention use this information, at least in part, to determine energy requirements of a home.

In response to receiving the user information data, geophysical data is downloaded from a source of geophysical data at step 2725. The downloaded geophysical information is determined based on the information provided by the customer. The geophysical information includes, for example, an image of the customer's residence including a view of the customer's roof. In one embodiment of the invention the customer is shown an image of their own home. In one embodiment of the invention the image is obtained using satellite image geo-coding software. One embodiment of the invention employs a GIS service (for example Google Earth) to obtain images to locate and view properties. In some embodiments of the invention, only one image is retrieved from a source of images. In other embodiments of the invention, for example, for embodiments relying on 3-dimensional models, more than one image is retrieved from a source of images. In other embodiments of the invention, site images are accessed without the need to download images from a source of images. For example, images are rendered on a display device of a computer system of a user.

Site dimensions are determined at step 2750. Examples of site dimensions include surface geometry, for example, the shape and area of a rooftop. In some embodiments site dimensions include pitch of a surface, for example, pitch of a roof. The site dimensions are determined by analyzing the images obtained in step 2725. In one embodiment of the invention the site dimensions are automatically determined by analyzing the images accessed at step 2725. In other embodiments of the invention site dimensions are determined or provided by a user. The site dimensions are used to generate energy system specifications for the installation site at step 2775.

Figure 5:
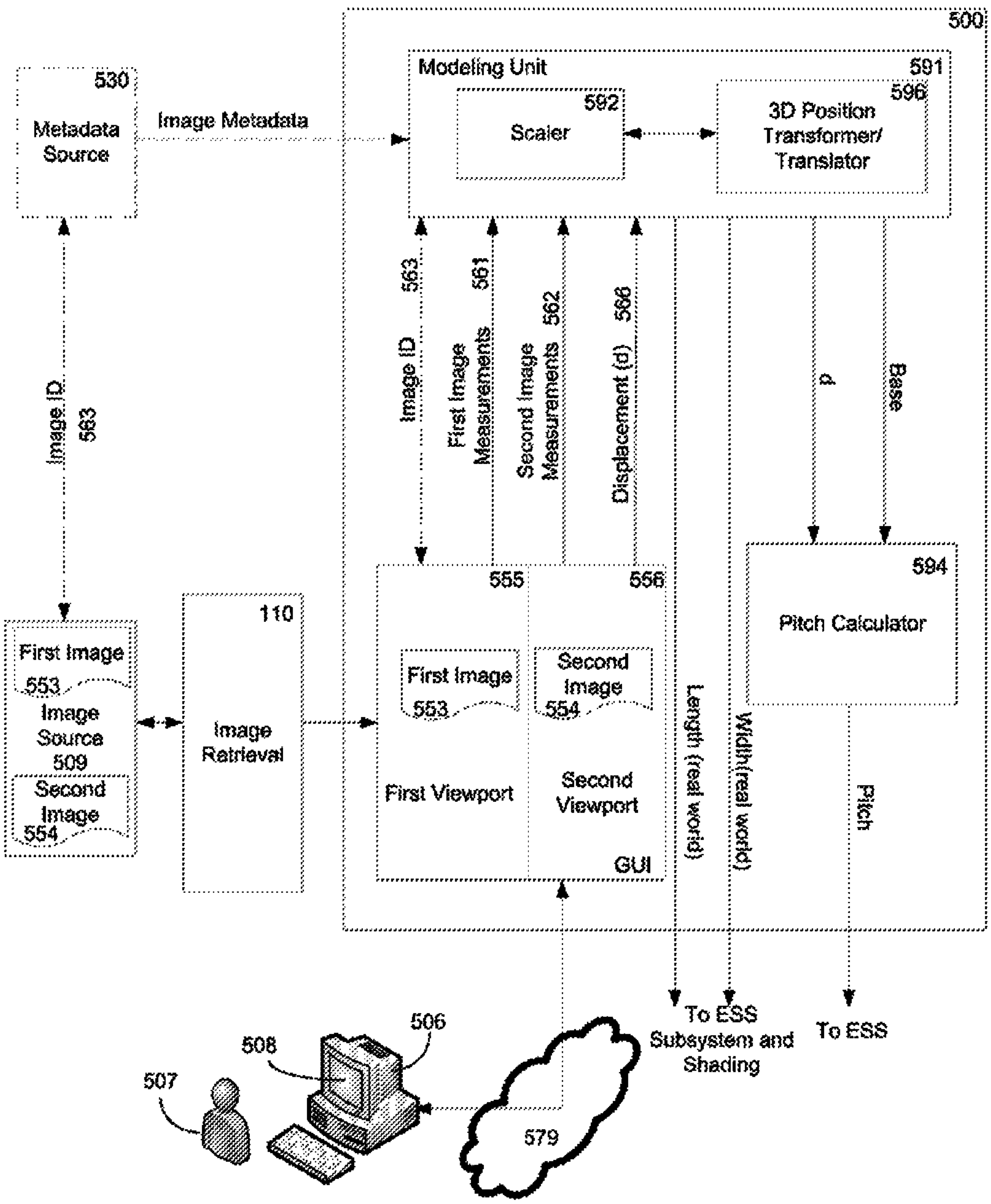
FIG. 5 is a block diagram of a sizing subsystem according to an embodiment of the invention.

FIG. 5 Sizing Subsystem 500

First Embodiment

The term 'sizing' as used herein refers to obtaining or generating length and width measurements for a generally rectangular planar installation surface such as a side of a roof. An installation surface is a surface area of a roof, for example a roof side contemplated for installation of energy system components. According to some embodiments of the invention, sizing of an installation surface is carried out by a sizing subsystem 500 automatically or at least partly automatically by means of user interaction with a GUI 560 of system 500.

FIG. 5 illustrates a remote sizing subsystem 500 according to an embodiment of the invention. Subsystem 500 includes a graphical user interface 560 configured for communication with a computer system 506 accessible by a user 507. GUI 560 is further configured for communication with an image retrieval subsystem such as subsystem 110 illustrated in FIG. 1. GUI 560 provides images for display on display device 508 of user system 506. By interacting with the displayed images, user 507 generates measurements 504 which are provided to a modeling unit 591.

Once an image of an installation surface is downloaded to system 100 a sizing subsystem 500 is deployed to measure the installation surface. In one embodiment of the invention, dimensions of an installation surface, for example, a roof area, are determined by superimposing images representing differing views of the roof surface. For example, at least two images representing different views of the surface are provided and displayed to a user via a graphical user interface. As illustrated in FIG. 5 a first image of the surface to be sized is displayed to the user via a viewport 555. A second image of the same surface to be sized is displayed to the user via a second viewport 556. In one embodiment of the invention, GUI 560 is configured to enable user 507 to manipulated images 553 and 554 such that one image is superimposed on the other. GUI 560 determines dimensions of the surface being measured by vector evaluation of image displacement.

In one embodiment of the invention, GUI 560 implements a sizing tool (examples illustrated in FIGS. 8-14.) The sizing tool is configured for interaction with user system 506 via a mouse, keyboard, cursor, trackball or other means such that user 507 is enabled to manipulate the sizing tool with respect to the images displayed in viewports 555 and 556. In that manner GUI 560 enables user 507 to measure dimensions of a surface appearing in images 553 and 554. GUI 560 records the measurements. In one embodiment of the invention, the recorded measurements are used to determine a configuration of solar panels suitable for installation on the surface, based on the measurements of the surface area and, in some embodiments, surface pitch.

According to one embodiment of the invention the shape of an installation surface is determined by plotting the perimeter of the installable area in a first view comprising a 2d representation of the installable area. The intersection of the plotted points with the plane of the installation surface determines the 3-dimensional installation surface perimeter.

Figure 6:
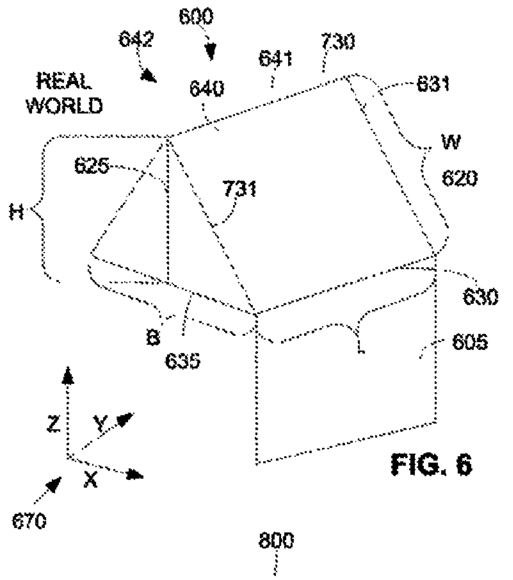
FIG. 6 is a perspective view illustrating dimensions of an example roof selected for installation of an energy system.
Figure 9:
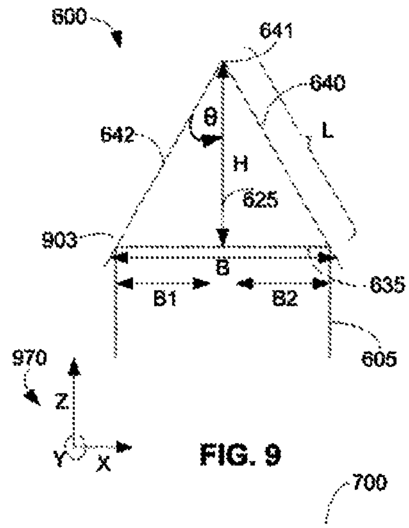
FIG. 9 is a side elevation view of a structure including an installation surface comprising a roof according to one embodiment of the invention.

FIGS. 6 and 9 illustrate respectively a perspective view and a side elevation view of a "real world" surface to be measured wherein the surface comprises a roof 600. Roof 600 is defined by roof side surfaces 640 and 641 (641 not visible in FIG. 6). As seen in FIG. 6 roof surface 640 is defined by parallel side edges 631 and 731 and parallel side edges 630 and 730. Roof side surfaces 640 and 641 meet to form a roof ridge 641. Roof ridge 641 is elevated with respect to a bottom side surface edge 630. The elevation of roof ridge 641 with respect to bottom edge 630 is represented by dimension H. A roof span of 600 is indicated as B. Roof 600 is oriented in FIG. 6 as indicated by axes 670. In FIG. 9 orientation of roof 600 is indicated at 970.

FIG. 10 illustrates a GUI 1000 enabling a user to measure portions of a surface to be sized, for example, portions of roof 600, illustrated in FIG. 6. In one embodiment of the invention, as illustrated by FIG. 10, an instructional video clip 1003 is displayed on a portion of the user's screen to assist user 507 in interaction with GUI 560. GUI 560 enables measurements of a surface such as a roof 600 to be determined by carrying out measurements on an image of the roof 600.

In one embodiment of the invention, a viewport 1000 displays an image in which a structure to be sized appears, for example, a house including a roof 600. In some cases an image presented in viewport 1000 will include roof 600 along with neighboring structures, for example, houses 1002 and 1004. In that case GUI 560 (FIG. 5) is configured to provide a marker, for example cross hair marker 1010. Marker 1010 is movable by user 507 via a mouse, trackball, or the like. In that manner user 507 is enabled to select, or indicate, a house, or a roof portion, to be sized by positioning marker 1010 over the image portion the user wishes to select.

A viewport 1000 is provided by GUI 560 (example first viewport illustrated in FIG. 5 at 555). In the embodiment illustrated in FIG. 10 system 500 provides a flat image of a roof which is, in real life, a three dimensional shape. As illustrated in FIG. 10 a surface area 1010 representing an installation surface is selectable by user 507 for sizing. As explained in more detail with respect to FIGS. 11-19, a user selects points on the image in the first viewport to define an installation surface.

Returning now to FIG. 5, the selected points are provided to modeling unit 591. Modeling unit 591 develops a description of the three dimensional roof shape based on two dimensional descriptions received from user system 506. In some embodiments of the invention, modeling unit 591 also receives image metadata for the image in viewport 1000. The image metadata is provided, for example, by a metadata source 530. System 500 uses the metadata to develop the three dimensional description of the roof 600. Image metadata includes, for example, image scale information for a displayed image. In one embodiment of the invention the scale information is used to determine a 'real world' size of roof 600 based, in part on roof dimensions measured on an image, and in part on metadata associated with the image.

In some embodiments of the invention metadata includes information such as latitude/longitude, altitude, position of camera, camera focal length etc. Meta data may be stored in the image itself for example, data stored in an image file, but not visible in the displayed image. In other embodiments of the invention, metadata is provided by a separate metadata data source 530. Metadata is cross referenced to a corresponding image, for example by image ID as indicated at 563.

In determining length and width of an image of a surface, sizing subsystem 500 cooperates with a modeling subsystem 591. Modeling subsystem 591 comprises a 3D transform/translation module 596 and a scaler 592. Image transform module 596 generates a transform, or map, for points on a user measured surface. The transform maps points defining the surface shape in one orientation with respect to a reference axis to corresponding points defining the surface shape in any other orientation with respect to the reference axis. Once a transform is generated, points defining a surface shape in, e.g., a perspective view are translatable to corresponding points comprising a side elevation model description of the shape.

FIG. 9 illustrates a side elevation view of the house 600 illustrated in FIG. 6. A side elevation description includes displacement information, e.g., relative height information. Relative height information is significant, for example, in determining a relative height of a roof ridge with respect to the roof base. Once the relative height is determined, pitch of a roof side is calculated using the height information and width information obtained during sizing.

For example, pitch of a roof 640, is given by rise (H)/run (B1). In one embodiment of the invention, run is estimated by determining the horizontal distance between a gutter edge 903 and roof ridge 641. Then the elevation (rise) of the ridge 641 above the gutter edge 903 is determined as indicated at H. Once horizontal distance (run) and elevation (rise) are determined, roof angle, and thus pitch, is calculated by pitch calculator 504. Therefore a homeowner need not manually measure a 'real life' roof in order to determine appropriate components sizes for an energy system to be installed on the roof.

Modeling unit 591 translates the points defining the shape in the viewed orientation of the displayed image to points defining the shape in a side elevation view, for example, as illustrated in FIG. 9. Points defining the shape in the side elevation view provide a scaled real world relative elevation of, for example, a roof ridge 641 with respect to a roof base 635.

Modeling unit 591 is coupled to a pitch calculator 594 to provide a displacement measurement H. For example, a displacement measurement H comprises a measure of z axis displacement of a roof ridge relative to a roof base for a roof base orientation along an x-y axis. Pitch calculator 594 provides pitch information, e.g., pitch of a roof based on the displacement and base information.

Thus sizing subsystem 500 is capable of determining height, width and pitch of an installation without the need for specific views, for example a plan view and an elevation view of a roof surface.

Figure 7:
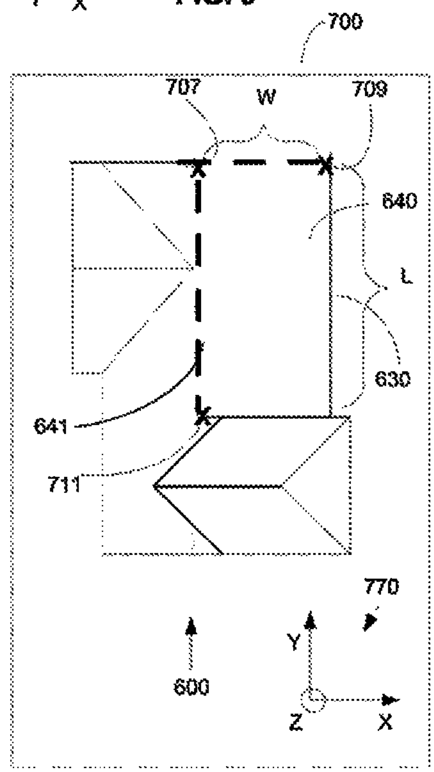
FIG. 7 is a top plan viewport of a roof installation surface illustrating placement of measurement indicia on a roof image according to an embodiment of the invention.

As illustrated in FIG. 5 GUI 560 provides viewports 555 and 556. Viewports 555 and 556 enable user 507 to view 2 dimensional representations, for example $1^{st}$ and $2^{nd}$ images 553 and 554, of a three dimensional scene. FIG. 7 illustrates an example viewport 700 displaying a first image of roof 600. Roof 600 is displayed to user 507 on a portion of display device 508 (illustrated in FIG. 5). A surface 640 of roof 600 under consideration for installation of an energy system is displayed within viewport 700. A roof 600 is displayed in viewport 700 at a first orientation with respect to a 3D axis 770. User 507 operates a mouse, trackball, keyboard or other input/output device coupled to user system 506 to interact with the image in viewport 700. To size installation surface 640 user 507 sets a first position indicator 711, e.g., a cross hair marker, on one corner of installation surface 640 of roof 600. User 507 sets a second indicator 707 on another corner of installation surface 640. User 507 sets a third position 709 by placing a third indicator on another corner of surface 705. First, second and third positions define a length and a width measurement of a rectangle representing dimensions of surface 640. In that manner $^{1st}$ measurements 561 are provided to modeling unit 591 as illustrated in FIG. 5.

In one embodiment of the invention, image scaling module 590 of modeling unit 591 receives the dimensions provided by GUI 560 for an image, for example, image 553. Image scaling module 590 further receives image scale information corresponding to image 553 from an image metadata source 530.

In some embodiments of the invention, image metadata is provided within the image information received from the image source, e.g. image source 509. In that case image retrieval module 110 extracts the image metadata from the received image information. In other embodiments of the invention image metadata is provided a source other than image source 509. In that case the metadata for respective images is provided to image scaling module 590. In some embodiments of the invention, information identifying an image corresponding to metadata and vice versa (as indicated in FIG. 5 at 563) is included in the image information and the metadata information. In that case the identifying information is used by system 500 to determine corresponding metadata for each displayed image.

Figure 8:
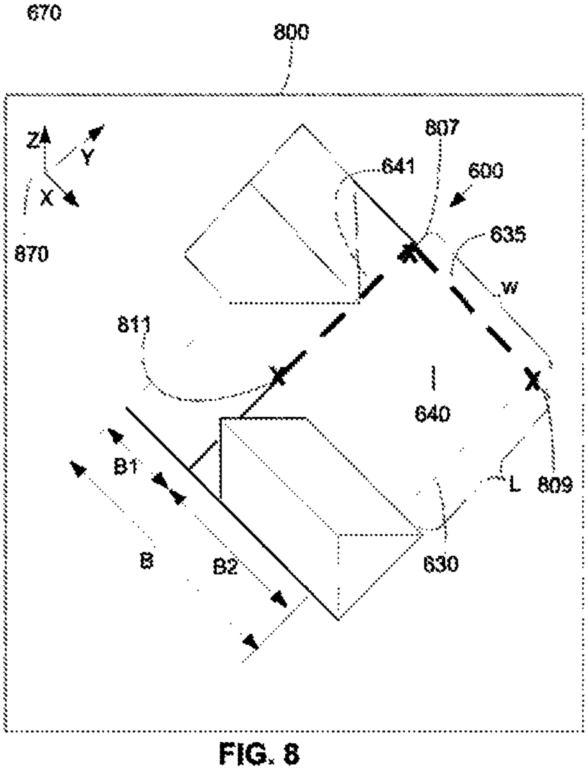
FIG. 8 is a top plan viewport of the installation surface illustrated in FIG. 7 viewed in a different orientation and including measurement indicia according to an embodiment of the invention.

FIG. 8 illustrates a viewport 800 displaying a second image of the roof of house 600 illustrated in FIG. 6. The second image is displayed at a second orientation 870 with respect to the 3D axis orientation 770 of the first image. User 507 interacts with second image 850 to set first, second and third positions in the second image. To set first, second and third positions, user 507 places an indicator, such as a cross hair marker, on corresponding corners 811, 807 and 809 of surface 640 as displayed in the second image. Each corner of surface 640 displayed in viewport 800 corresponds to a respective corner of surface 640 displayed in viewport 700. For example corner 711 displayed in viewport 700 corresponds to corner 811 displayed in viewport 800.

As marked by user 507 first, second and third positions define a length and a width measurement of generally rectangular surface 640. Each measurement is taken in the second image with respect to a different axial orientation of the corresponding measurement taken in the first image. In that manner $1^{st}$ and $2^{nd}$ length and width measurements 562 are provided to modeling unit 591 as illustrated in FIG. 5.

In one embodiment of the invention described above, a translator unit 596 comprises a commercially available 3D modeling software package such as AutoCad™. When provided with points defining a shape in first and second orientations, translator unit 596 is configured to describe the shape in any orientation, for example a side elevation view orientation illustrated in FIG. 9. In that manner translator unit 596 provides a measurement H (indicated at 625 of FIG. 9) representing displacement of roof ridge 641 from roof base 635.

Second Embodiment

Alternative embodiments of sizing subsystem 500 are illustrated in FIGS. 11-19. FIG. 11 illustrates various example embodiments of an interactive measuring tool (1150, 1107, and 1117) for use in sizing surfaces such as roof of house 600 in FIG. 6. In one embodiment of the invention at least one of tools 1150, 1107 and 1117 are displayed in a viewport 110 to a user. A user selects a tool to use for measuring. User manipulation of a selected measuring tool positions the tool with respect to first and second images depicting the same surface, for example roof of house 600 in FIG. 6. The measuring tool is rotatable and scalable by user 507 to align at least two sides of the tool an image of an object to be measured, for example a roof surface to be measured.

In one example embodiment of the invention, a user selects tool 1150 from viewport 1100. In one embodiment dimensions of side 1187 and 1177 of interactive measuring tool 1150 are calibrated before displaying tool 1150 in viewport 1100. For example, a scale of pixels to feet is determined for image of a roof of a house 600 based on metadata associated with the image of house 600. Therefore, system 100 is enabled to provide 'real world' measurements for a roof surface by relating the known scale to the displayed tool sides.

The position of interactive measuring tool 1150 within viewport 1100 is adjustable by user interaction with tool 1150 via a mouse, keyboard, trackball or other input/output device. In addition, length of sides 1187 and 1177 are user adjustable. Referring now to FIG. 6, in order to measure an installation surface area, such as a roof 640 area of house 600 in FIG. 6, user 507 positions measuring tool 1150 over an image of roof 600 in alignment with a side of the image of roof 600. User 507 adjusts the length of a tool side, for example side 1187, of measuring tool 1150 to correspond in length to the length of a side of the image of roof 600. Another side 1187 of measuring tool 1150 is aligned with a third side of the image of roof 600 and likewise adjusted in length to correspond to the length of corresponding side in the image.

A roof ridge 641 is marked by user 507 dragging a line tool along an image of ridge 641 within the perimeter of measuring tool 1150. When the ridge line has been drawn, user 507 initiates a reading of dimensions of measuring tool 1150. In addition, an orientation of measuring tool with respect to axes 670 (of FIG. 6) is determined.

FIG. 12 illustrates an image 1215 representing a top plan view of a surface, or face of a 3D shape such as the roof of house 600 illustrated in FIG. 6. According to one embodiment of the invention a viewport 1200 displays first image 1215 to user 507. The imaged surface shape 1215 is defined by a length L (at 1230), a base B (indicated at 1235) and a ridge line 1241. The surface shape 1215 is oriented in accordance with a reference plane, for example the x-y plane of reference axis 1211. User 507 operates a mouse, trackball, keyboard or other input/output device coupled to user system 506 to interact with the image 1215 as described below.

To size surface 1215 user 507 superimposes sizing tool, in this example tool 1117 (illustrated in FIG. 11) over at least a portion of image 1215. In one embodiment of the invention two sided sizing tool 1117 is defined by sides 1127 and 1137. User 507 adjusts the dimensions of at least one of the tool sides 1127 and 1137 using a keyboard, mouse, trackball or other input/output device. For example, the length of tool side 1137 is adjusted to match a corresponding side length, e.g., L at 1230 of image surface 1215. In one embodiment of the invention user 507 adjusts a side width (e.g., at 1127 in FIG. 11) of sizing tool 1117 to match the length B (at 1235) of surface image 1215. In that manner user 507 generates measurements which describe shape 1215 by length and base measurements. Further in some embodiments, information defining an orientation of shape 1215 with respect to a reference axis 1211 is generated by comparing orientation of adjusted tool 1107 to reference axis 1211. The orientation information is provided to modeling unit 591.

The image measurements comprising dimensions and orientation of measuring tool 1117, as adjusted to image 1215 in viewport 1200, are provided to modeling unit 591 as illustrated in FIG. 5. Modeling unit 591 determines a transform that enables points defining the shape of measuring tool 1117, as adjusted to image 1215 in a top down orientation of FIG. 11, to be mapped to a projected shape of measuring tool 1117 as it would appear in any other orientation of tool 1117 in a 3D space. The transform enables subsequent adjustments of any portion of tool 1117 by a user to cause automatic corresponding adjustment of remaining portions of tool 1117 such that the aspect ratio of side 1127 to side 1137 of tool 1117 is preserved through subsequent measurements and movement of tool 1117.

Having set the aspect ratio of tool 1117, user 507 manipulates measuring tool 1117 to a second viewport 1300, illustrated in FIG. 13. FIG. 13 illustrates a viewport 1300 displaying a perspective image 1315 of roof of house 600 (illustrated in FIG. 6). Perspective image 1315 of roof of house 600 is oriented with respect to a reference 3D axis 1311. Viewport 1300 permits manipulation of tool 1117 in three dimensions, x, z and z, with respect to axis 1311. User 507 adjusts tool 1117 with respect to the base B and length L of perspective image 1315 in three dimensions such that at least one of the width or length of the sizing tool 1117 matches a corresponding one of base B and length L of image 1315.

Manipulation of measuring tool 1117 in 3 dimensions (for example to align with B and L of 1315 in FIG. 13) is enabled by transform/translation unit 596 of modeling unit 591, illustrated in FIG. 5. Adjustment of length of any side of measuring tool 1117 causes corresponding adjustment of length of remaining side of tool 1117.

Figure 15:
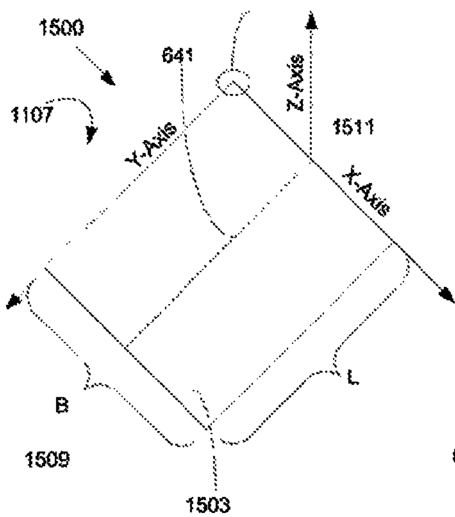
FIG. 15 is a perspective view of the measurement tool illustrated in FIG. 11.
Figure 14:
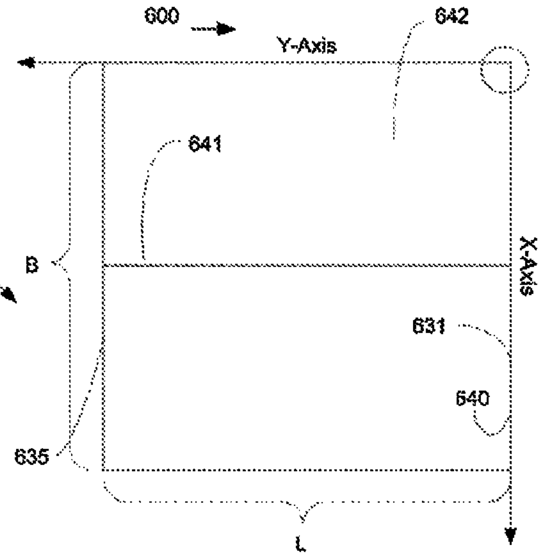
FIG. 14 is a top plan view of the roof illustrated in FIG. 11.

FIG. 15 illustrates an embodiment of measuring tool 1107 of FIG. 11 in 3 dimensions for alignment with roof image 600 in viewport 1300 illustrated in FIG. 13. A ridge line is indicated in FIG. 15 at 641

Figure 16:
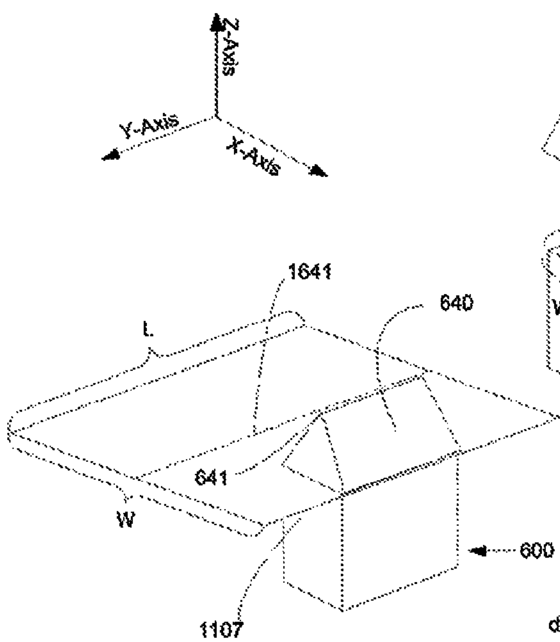
FIGS. 16-19 illustrate positioning of the measuring tool of FIG. 11 with respect to the roof illustrated in FIG. 11 for various orientations of a roof image.
Figure 17:
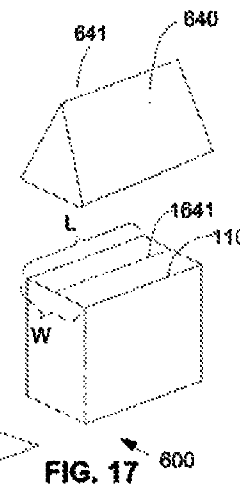

FIGS. 16-10 illustrate successive steps in manipulating measuring tool 1107 to obtain measurements of a roof image. For example, the steps indicate placement of measuring tool 1107 in viewport 1300 with respect to an image of roof 600 (illustrated in FIG. 6). Once placed in an appropriate orientation, that is, in alignment with a side of the image, side lengths of tool 1117 are adjusted to conform to side lengths of roof of house 600, as illustrated in FIG. 17. Measuring tool 1107 is positioned in FIG. 17 such that side b of measuring tool 1107 aligns with base b of roof 600. When measuring tool 1107 is positioned as illustrated in FIG. 17 $2^{nd}$ measurements are obtained of measuring tool 1107. In addition information about orientation of measuring tool 1107 with respect to a reference axis 1611 is provided to modeling tool 1107. Transform/translation unit 596 uses information thus provided, in addition to information provided by scaling unit 592, to determine 'real world' measurements for roof 600.

Figure 18:
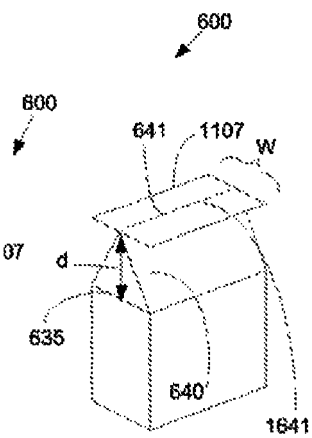
Figure 19:
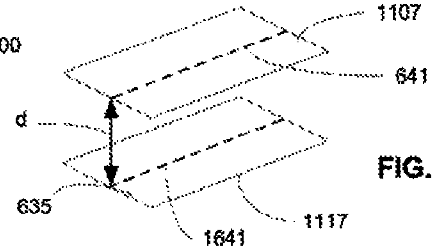

FIGS. 18 and 19 illustrate measuring tool 1107 as used to measure displacement of a ridge of roof 650 from base 635. The displacement information is used by modeling unit 591 (FIG. 5) to determine pitch of roof 600. As illustrated in FIG. 18 user 507 displaces measuring tool 1107 in the z direction from its position illustrated in FIG. 17 to the position illustrated in FIG. 18, i.e., displaced by a distance d from base 635 to ridge 641. FIG. 19 illustrates a difference d between placement of measuring tool 1107 in FIG. 17 and placement of measuring tool 1107 in FIG. 18. The difference measurement d is provided to modeling unit 591. Transform translation unit 596 determines height h of ridge 641 with respect to base 635 of real world roof 600. Once the real world height is known, pitch of the roof is determined.

The description provided above relates to one embodiment of measuring tool 1107. An alternative embodiment of measuring tool 1107 is illustrated in FIG. 11 at 1117. In the embodiment illustrated at 1117 of FIG. 11 only two sides of a measuring tool (one side representing width and one side representing length) are displayed to user 507.

Returning now to FIG. 5, 3D transformer/translation module 596 uses the displacement information to generate a 3D model of roof 600. The model provides a description corresponding to a side elevation view of the same roof 600 including a height dimension d. An example side elevation description is illustrated in FIG. 9.

In one embodiment of the invention scaling unit 592 translates viewport dimensions to real world dimensions. In one embodiment of the invention the real world dimensions are obtained from metadata. The system then tracks changes in the geometry of measuring tool 1107 in relation to the real world dimensions.

In some embodiments of the invention images displayed in a viewport are adjusted to conform to conventions. For example, in one embodiment of the invention images are scaled to ensure x pixels in a displayed image=x feet in a real world imaged object. In another example, an image orientation is adjusted such that a vertical direction (up down) in the real world imaged object corresponds to a selected reference axis, e.g., a Z axis for the image displayed in a viewport.

A simple implementation of installation surface measuring tool 1107 comprises a 2D rectangle with predetermined height and width (equivalent to a 3D box with height=0) overlaid over the image of an object with known magnification/scale/resolution (resolution) and rotation (e.g. 1 pixel=1 foot top-down image). The dimensions (height & width) of the first model can be adjusted to match the dimensions of the object. Since the resolution of the image is known, the real-world dimensions of the object can be calculated. (e.g. A length of 10 pixels on the image could represent 10 feet on the ground).

Figure 28:
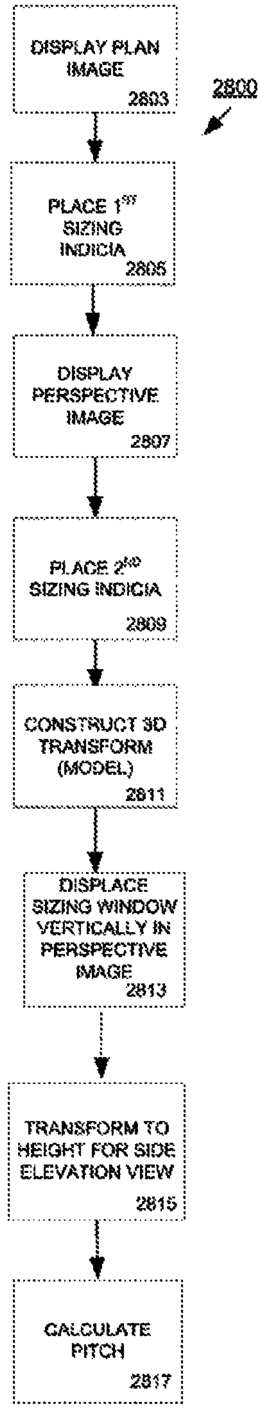
FIG. 28 is a flowchart illustrating steps of a method for determining pitch according to an embodiment of the invention.

FIG. 28 illustrates steps of a method for determining pitch of an installation surface. a plan view of an image representing the installation surface is displayed at step 2803. First indicia are positioned about a perimeter of the installation surface image at step 2805. A perspective image of the installation surface is displayed at step 2807. Second indicia are placed about the perimeter of the image of the installation surface. At step 2813 a sizing window is displaced vertically in the perspective to traverse the distance between the base of the installation surface and a ridge of the surface. The displacement is transformed to a height measurement, for example height corresponding to a side elevation view and representing real world height of a roof ridge. Pitch is calculated at step 2817 based on the height.

Figure 20:
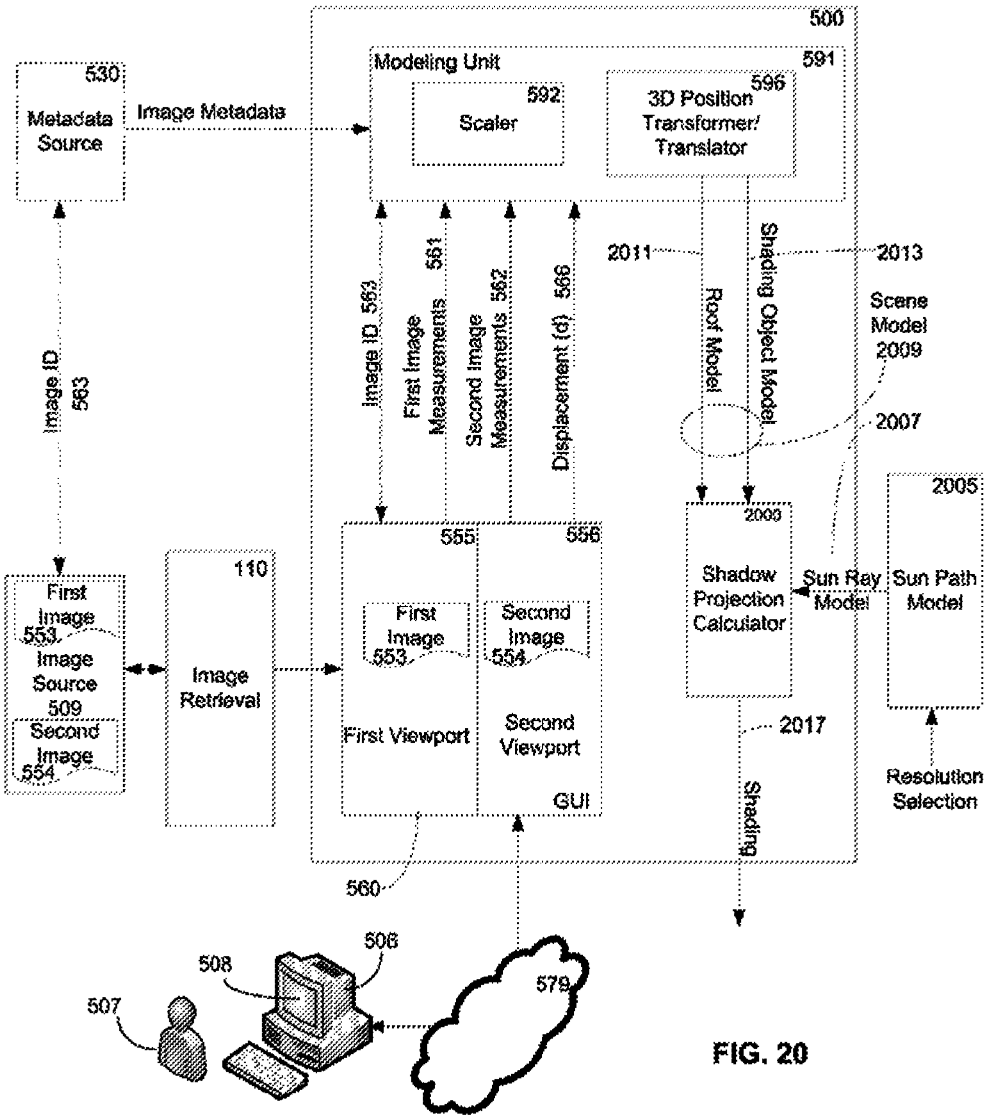
FIG. 20 is a block diagram of a sizing unit configured to provide shading information for an installation surface according to an embodiment of the invention.
Figure 21:
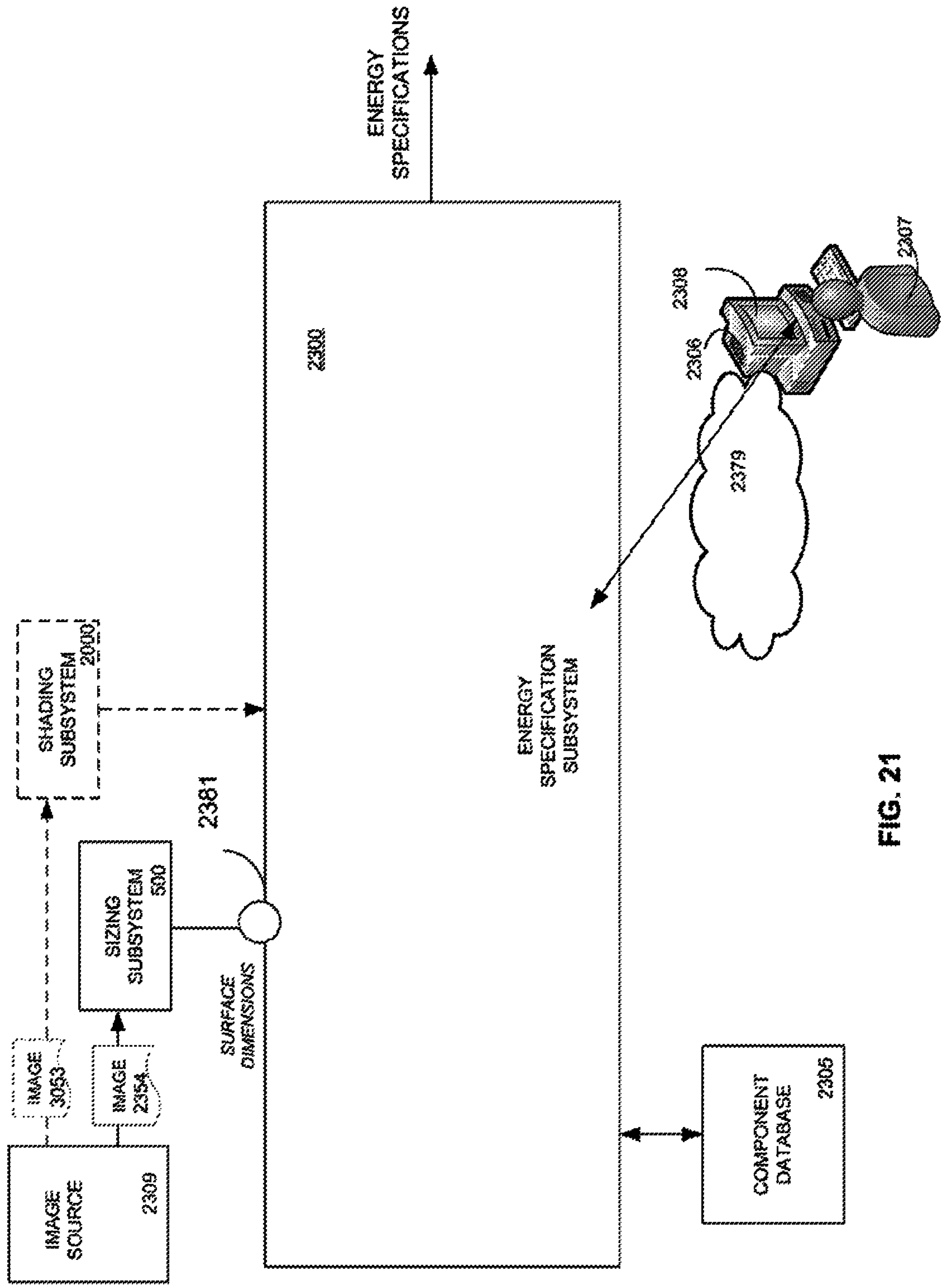
FIG. 21 is a block diagram of an energy specification subsystem according to an embodiment of the invention.

FIG. 20 Shading Subsystem

Photovoltaic cells' electrical output is extremely sensitive to shading. When even a small portion of a cell, module, or array is shaded, while the remainder is in sunlight, the output falls dramatically. Therefore embodiments of the invention provide systems and methods that consider shading factors such as trees, architectural features, flag poles, or other obstructions in provisioning a solar energy system.

FIG. 20 illustrates an embodiment of a sizing subsystem 500 configured to determine shading for an installation surface. To determine shading user 507 measures images of shading objects as they appear in viewports together with an installation surface. User 507 sizes shading objects in the same manner as described above for sizing a roof.

Various embodiments of the invention use a plurality of corresponding images (and associated meta-data, where available) of a single structure to determine shading factors. A technique of one embodiment of the invention maps real-world points in a 3d space to images of a structure. Reference shapes comprising two and/or three dimensional shapes are super-imposable onto one or more of these images in a manner similar to that described above for measurement tool 1107 of FIGS. 12-19.

Measurements resulting from the superimposition are used by modeling unit 591 to calculate angles, distances, and relative positions of potential shading objects with respect to an installation surface. In one embodiment of the invention a user is enabled to create and/or manipulate basic shapes, such as measuring tool 1107, to superimpose the basic shapes onto images of the structure obtained by mapping real-world points. In one embodiment of the invention real-world points are referenced to images obtained, for example, from a geographic or geologic database comprising two dimensional and/or three dimensional satellite images of structures such as residential structures.

According to some embodiments of the invention a 3D model of a shading object is constructed by user 507 indicating a first set of perimeter points in a first image of a shading object and indicating a second set of corresponding perimeter points in a second image of the same object. In other embodiments of the invention top-most points of shading objects are identified without indicating perimeter points. In some embodiments of the invention shading objects are created for a scene using 3d primatives or meshes. In some embodiments shading objects are created using Computer Assisted Drawing (CAD) software.

In other embodiments shading objects are created automatically by turning multiple perimeter points from one-or-more viewports into a 3d object/mesh. Modeling unit 591, including scaler 592 and 3D position transformer translator 596, operate on the indicated points in the first and second images in the same manner as described with respect to indicators for installation surfaces. Modeling unit 591 provides a scene model comprising three dimensional descriptions of an installation surface as well as user selected shading objects in the vicinity of the installation surface. A shadow projection calculator receives the scene model from modeling unit 591.

In addition shadow projection calculator receives a sun ray model form sun path model 2005. In one embodiment of the invention sun path model 2005 comprises a database of sun ray projections by latitude and longitude and by month, year, day and time of day. In one embodiment of the invention boundaries of shadows cast by shading objects on the installation surface are determined by projecting the outline of the shading object onto the installation surface, the lines of projection being parallel to the sun's rays. The direction of the sun's rays relative to the installation surface is determined by comparing the sun ray model to the scene model.

Sun path model 2005 is based upon charts or sun calculators that have been prepared by different organizations. One example of widely available solar diagrams is the Sun Angle Calculator, which is available from the Libby-Owens-Ford Glass Company in the United States. This is a slide rule type of device that will indicate directly the value of H.S.A. and V.S.A. for any time and date during the year at all the latitudes evenly divisible by four between 24 and 52 degrees. The calculator can also be used to estimate the solar irradiation that any sunlit surface can receive on a clear day at any season. Another suitable set of charts is the Diagrammes Solaires prepared by the Centre Scientifique et Technique du Bâtiment in France. These charts and an accompanying brochure on how to use them (in French) are available through the Division of Building Research of the National Research Council of Canada or directly from C.S.T.B. in Paris. These are suitable to construct the H.S.A. and V.S.A. for any combination of time, date, latitude and wall orientation.

The position of shadows on the installation surface is determined by reference to scene model 2009. The scene model is oriented in a reference orientation and rotated in a 3D space to simulate the daily rotation of the earth. In that manner scene model 2009 and sun ray model 2007 are configured to simulate a conventional heliodon. A heliodon is a special turntable that causes a physical scene model to move with respect to a reference light source as the real world scene will move with respect to the sun. The model adjustable for latitude and date. The orientation of the installation surface is taken into account when initiating the model rotation.

Table 1 provides an example shadow calculation useful for implementing embodiments of shadow projection calculator 2000.

TABLE I

Length of Projection in Feet Required to Cast A Shadow 1 Foot High on a Building at 44° North Latitude

| Time | Surface Orientation: South | | 30° East of South | | 60° East of South | | East | |
|---|---|---|---|---|---|---|---|---|
| (Sundial Time) | 21 May 21 Jul. | 21 Mar. 21 Sep. | 21 May 21 Jul. | 21 Mar. 21 Sep. | 21 May 21 Jul. | 21 Mar. 21 Sep. | 21 May 21 Jul. | 21 Mar. 21 Sep. |
| 8 | 0.14 | 0.97 | 0.83 | 2.04 | 1.29 | 2.56 | 1.41 | 2.40 |
| 9 | 0.30 | 0.97 | 0.73 | 1.53 | 0.95 | 1.68 | 0.93 | 1.39 |
| 10 | 0.39 | 0.97 | 0.62 | 1.24 | 0.69 | 1.18 | 0.57 | 0.80 |
| 11 | 0.43 | 0.97 | 0.51 | 1.02 | 0.45 | 0.81 | 0.27 | 0.37 |
| 12 | 0.45 | 0.97 | 0.39 | 0.84 | 0.22 | 0.48 | — | — |
| 13 | 0.43 | 0.97 | 0.24 | 0.65 | — | 0.16 | — | — |
| 14 | 0.39 | 0.97 | 0.05 | 0.44 | — | — | — | — |
| 15 | 0.30 | 0.97 | — | 0.14 | — | — | — | — |
| 16 | 0.14 | 0.97 | — | — | — | — | — | — |

In addition a variety of graphics programs for visualizing solar shading for proposed building are commercially available and suitable for use in constructing various embodiments of the invention. For example "Visual Sun Chart" is a graphics program useful to determine if access to solar energy for an installation surface.

According to an embodiment of a method of the invention, images are analyzed to determine if there are any objects shading a proposed system at greater than a given angle above the horizon. For example in one embodiment of the invention images are analyzed to determine if there are any objects shading a proposed system at angles between about 5 degrees and 50 degrees between stated points on the azimuth. In another embodiment of the invention images are analyzed to determine if there are any objects shading a proposed system at greater than about a 26 degree angle between stated points on the azimuth.

The shading information thus obtained is used in one embodiment of the invention to determine the level of rebate applicable to a proposed system at that site. In contrast to systems of the invention, conventional systems perform this step manually by a costly on-site visit. A technician uses a tool that measures the geometric angles of objects located in the viewfinder of the tool, facing away from the system to determine shading impact. The techniques of some embodiments of the invention obviate the necessity of such an on-site visit.

Sun Path Model 2005

Table is an example of data comprising sun path model 2005.

| Time (solar) | Mar. 21 and Sep. 21 | | Jun. 21 | | Dec. 21 | |
|---|---|---|---|---|---|---|
| $\square_s$ | $\square_s$ | $\square_s$ | $\square_s$ | $\square_s$ | $\square_s$ | $\square_s$ |
| 06.00 | 0.0 | −89.6 | 5.4 | −247.1 | 0.0 | −67.2 |
| 08.00 | 29.0 | −81.8 | 32.7 | −250.7 | 20.6 | −58.1 |
| 10.00 | 57.1 | −67.0 | 60.0 | −246.6 | 42.7 | −38.6 |

-continued

| Time (solar) | Mar. 21 and Sep. 21 | | Jun. 21 | | Dec. 21 | |
|---|---|---|---|---|---|---|
| $\square_s$ | $\square_s$ | $\square_s$ | $\square_s$ | $\square_s$ | $\square_s$ | $\square_s$ |
| 12.00 | 75.9 | 0.0 | 80.3 | −180.0 | 52.9 | 0.0 |
| 14.00 | 57.1 | 67.0 | 60.0 | −113.4 | 42.7 | 38.6 |
| 16.00 | 29.0 | 81.8 | 32.7 | −109.3 | 20.6 | 58.1 |
| 18.00 | 0.0 | 89.6 | 5.4 | −112.9 | 0.0 | 67.2 |

The sun-path model 2005 is a plot of the angular position of the sun as it traverses the sky on a given day. In such a model, the horizontal axis shows the azimuth angle, and the vertical axis shows the altitude angle.

Solar time is the time based on the physical angular motion of the sun. Solar noon is the time when the altitude angle of the sun reaches its peak. Solar time can be calculated from $$t_s=t_l-4(L_{gs}-L_{gl})+E_{qt}$$

where $t_s$=solar time, $t_l$=local standard time, $L_{gs}$=standard local longitude, $L_{gl}$=actual longitude, and $E_{qt}$=equation of time (min).

Figure 29:
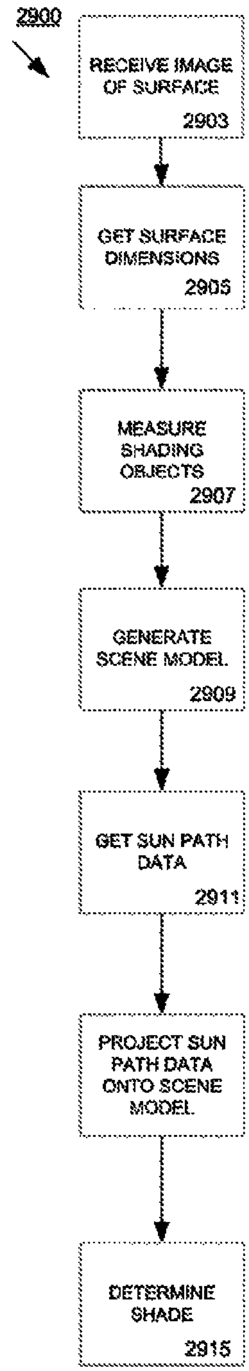
FIG. 29 is a flowchart illustrating steps of a method for determining shading for an installation surface according to an embodiment of the invention.

FIG. 29 illustrates steps of a method for determining shading for an installation surface. At step 2903 an image of the installation surface is received. At step 2905 dimensions of the surface are determined by measuring the surface as it appears in the image. At step 2907 shading objects appearing in the image are measured. At step 2909 a scene model is generated based on the measurements of the surface and the shading objects. At step 2911 sun path data is obtained. At step 2913 the sun path data is used to determine sun ray projection onto the scene model. At step 2915 shading for the surface is determined based on the sun ray projection.

Panel Orientation

One embodiment of the invention accounts for panel orientation in determining sun access of an installation surface. In one embodiment of the invention a solar panel array is mounted at a fixed angle from the horizontal. In other embodiments of the invention a solar panel array is mounted on a sun-tracking mechanism. According to one embodiment of the invention sizing subsystem 500 of a system of the invention is configured to communicate with a source of solar data, for example sun path model 2005. In one embodiment of the invention the source of solar data comprises average high and lows for panels oriented at the same angle as the latitude of major US cities. Sizing module 500 determines a recommended orientation for solar panels based at least in part on the information obtained from the source of solar data 2005.

In one embodiment of the invention a solar panel array is mounted on an installation surface at a fixed angle from the horizontal. In other embodiments of the invention a solar panel array is mounted on a sun-tracking mechanism.

Figure 23:
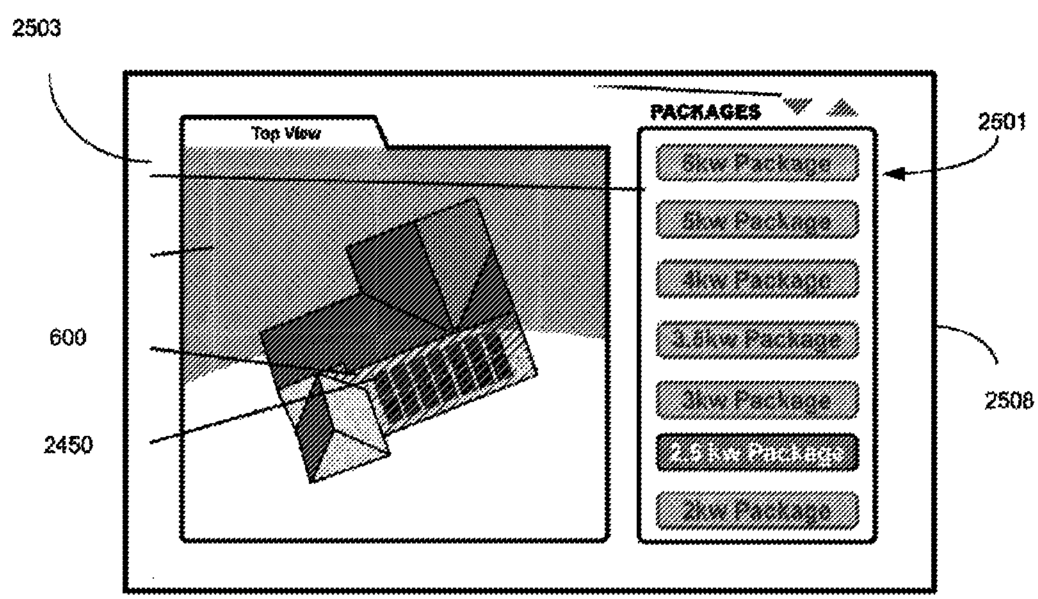
FIG. 23 illustrates a display screen providing an image of a user selected installation surface including an installed energy system and providing information related to the installed energy system.

FIG. 23 Generating Energy System Specifications

One example embodiment of the invention generates energy system specifications customized for a user selected installation site. Energy system specifications relate to energy generating capacity of a selected site. For example for installation of a solar energy system, a roof surface is evaluated to determine energy related parameters, such as available installation area, orientation of the installation surface with respect to the sun, and the effects of shading objects on the installation surface. A total maximum energy generating capacity of the roof is determined based on the parameters and based on the energy generating characteristics of available solar system components.

FIG. 23 is a block diagram of an energy system specification (ESS) generator 2300 according to an embodiment of the invention. ESS generator 300 receives surface dimension information related to a site at input 381. In one embodiment of the invention input 381 is provided with sizing information, for example, from sizing subsystem 200. Sizing information can include, for example, surface area available for installation, shape of the available area, slope of the area, and other information related to the installation site.

ESS generator 2300 provides energy system specifications for a site based on the surface dimension information for the site. Energy system specifications comprise information for determining suitable energy system components for installation on a site to be provisioned. For an example site comprising a rooftop, ESS generator determine energy per square foot of roof surface.

In one embodiment of the invention, ESS generator determines an amount of energy which is potentially generated by each installable surface area of an installation site. In one example embodiment, energy potentially generated is given by:

$$\text{Surface Area}\times\text{Solar Insulation}\times\text{Energy reduction due to pitch \& azimuth}=\text{Potential Solar Energy}.$$

Wherein surface area is an amount of surface area in square meters (or equivalent) and solar Insulation is the amount of solar energy radiation received, typically measured as "kilowatt hours per year per kilowatt peak rating".

In one embodiment of the invention solar insulation is calculated based on data in a solar insulation database (not shown). In that embodiment user-provided location information is used to search the insulation database for a solar insulation data associated with the site selected for installation. The insulation calculations are carried out in one embodiment of the invention using the energy system specifications generated by energy system specification subsystem 2300 to correspond to installation surface dimensions provided by sizing subsystem 200. In other embodiments of the invention energy system specification subsystem 2300 calculates insulation based on local electric costs determined by reference to a database such as database 117 (illustrated in FIG. 1).

In one embodiment of the invention ESS generator 2300 provides specifications for a site based on site's latitude and longitude. In one embodiment of the invention the calculation accounts for pitch & azimuth information received from sizing subsystem 200. As used herein the term 'azimuth' refers to an angle with respect to north. In some practical implementations of energy systems, energy output of an installed energy system is reduced due to pitch & azimuth considerations.

In one embodiment of the invention a combination of tilt of a slope compared to "flat" and the azimuth of the slope is determined by system 2400 based on information provided by sizing subsystem 200. The energy received by a surface is reduced by this determination. An amount of the reduction amount is calculated automatically in one embodiment of the invention.

In another embodiment of the invention the reduction amount is calculated by reference to a suitable database containing standard reference tables. In one embodiment of the invention ESS generator 2300 identifies a model site with characteristics similar to the site under evaluation by ESS generator 2300. A dataset for the model site is adjusted to match as closely as possible the characteristics of the site under consideration by ESS generator 2300. For example, if a site under consideration by ESS generator 2300 is twice as big as a model site and at the same tilt & azimuth, then ESS generator 2300 multiplies the Energy System Specification parameter "energy output" by 2 for the site under consideration. In one embodiment of the invention ESS generator 2300 is provided with shading information from a shading subsystem 500. Shading information is provided for the surface for which specifications are to be generated. Shading effects are expressed as energy per square foot of surface area in one embodiment of the invention.

In some embodiments of the invention ESS subsystem 2300 receives information about home energy consumption related to the consumer's residence from a source of residential energy consumption, for example database 117 illustrated in FIG. 1. ESS generator 2300 adjusts an energy system specification based on the home energy consumption information. For example, if home energy consumption is lower than the potentially generated energy, the system specifications may be adjusted such that a system with a lower than maximum possible energy output is defined.

One embodiment of the invention provides for automatic selection of energy system components based on energy system specifications provided by ESS generator 2300. For example, specifications for energy system components are stored in a component database 2305. ESS generator 2300 is configured to communicate with component database 2305. ESS generator 300 compares energy system specifications stored in the database with specifications for energy system components for a site.

Figure 25:
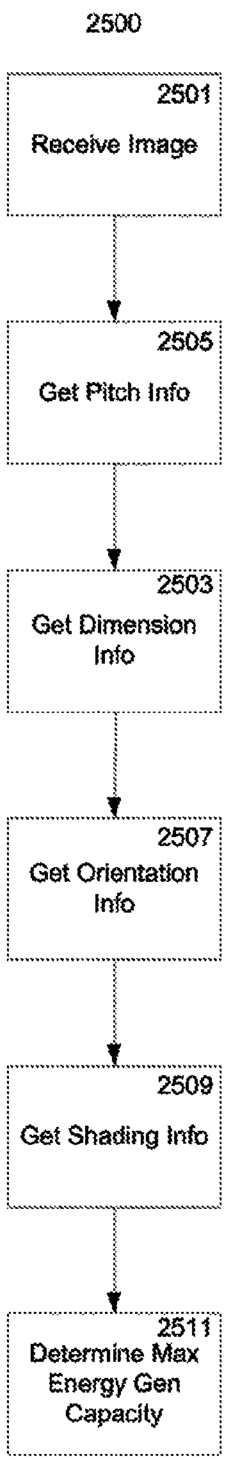
FIG. 25 is a flowchart illustrating steps of a method for providing energy system specifications according to an embodiment of the invention.

FIG. 25 is a flowchart illustrating steps of a method for generating energy system specifications according to an embodiment of the invention. At step 2501 an image including a surface upon which an energy system is to be installed is received. At step 2503 pitch of the installation surface is determined by measuring the surface as it appears in the image. At step 2505 dimensions of the installation surface are determined by measuring the surface as it appears in the image. At step 2507 compass orientation of the installation surface is determined. In one embodiment of the invention compass orientation is determined by analyzing the image of the surface. In other embodiments of the invention compass orientation is determined using metadata associated with the image.

In an optional step 2509, shading information for the installation surface is calculated based on the image of the surface including shading objects impacting the installation surface. Maximum energy generating capacity of the installation surface is determined by accounting for the pitch, surface dimensions, surface orientation and shading in determining insulation of the surface. In some embodiments of the invention energy generating capacity is calculated considering energy generating capacity of selected energy system components. In one embodiment of the invention energy generating capacity is expressed as KW per square foot.

Components

Figure 24:
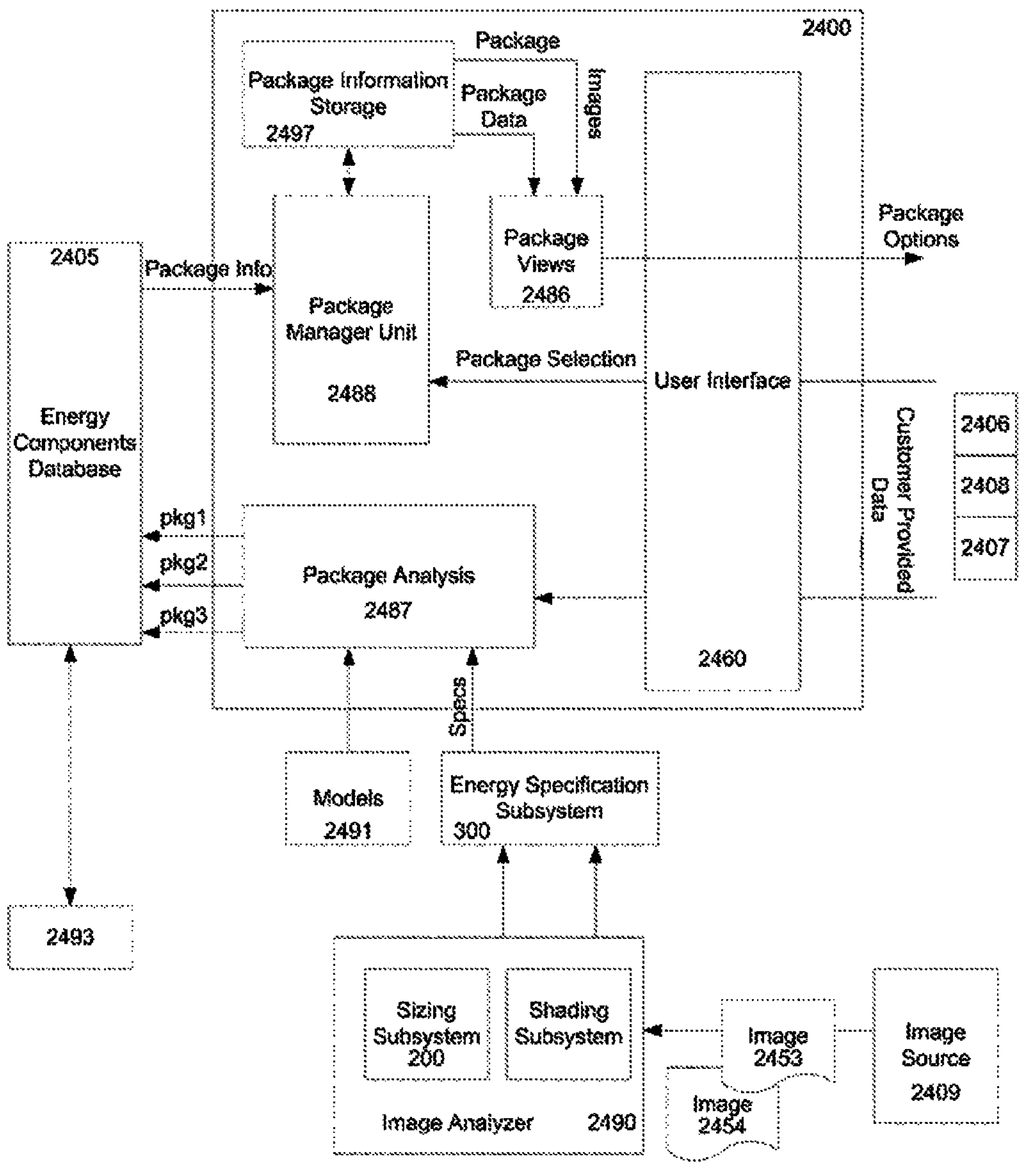
FIG. 24 is a block diagram of a quote subsystem according to an embodiment of the invention.

FIG. 24 illustrates an example solar energy system 2400 including typical components. Information about the components of energy system 2400 are stored in component database 2305 of subsystem 2300. System 2400 comprises an array 2450 of solar panels 2401-2409. Panels 2401-2409 are connected through a DC disconnect 2411 to an inverter 2413. Inverter 2413 is connected through a meter 2414 to an AC disconnect component 2415. AC disconnect component 2415 is connected to an AC service Entrance 2417. AC service entrance 2417 is connected through utility meter 2419 to a conventional energy grid.

Table 1 provides example specification information for components, for example, commercially available solar system panels.

TABLE 1

| Model | XW6048-120/240-60 | XW4548-120/240-60 | XW4024-120/240-60 |
|---|---|---|---|
| Part Number | 705200 | 705201 | 705202 |
| Price | $4500.00 | $3950.00 | $3950.00 |
| Output Power (Watts) | 6000 | 4500 | 4000 |
| Surge rating (10 seconds) | 12000 | 9000 | 8000 |
| Efficiency - Low Load | | 95% | |
| Efficiency - CEC weighted | 92.5% | 93% | 91% |
| CEC power rating | 5752 W | 4500 W | 4000 W |
| DC Current at rated power | 130 A | 96 A | 178 A |

FIG. 24 Quoting System

FIG. 24 illustrates a quoting subsystem 2400 according to an embodiment of the invention. Quoting subsystem 2400 comprises a user interface module 2460 configured for communication with a computer system 2406 of a user 2407. In some embodiments of the invention user 2407 is a potential purchaser of an energy system. For example user 2407 is a homeowner interested in purchasing a solar energy system for installation on a roof of a home. In other embodiments of the invention, user 2407 is third party provider of solar energy systems. In that case user 2407 interacts with quoting system 2400 to provide quotes to, for example, commercial enterprises, government agencies and other parties interested in procuring a solar energy system for installation on a site. User interface module 2460 is coupled to a package analysis module 2487, a package manager unit 2488, and a package view unit 2486.

In one embodiment of the invention a visual image of the customer's roof is displayed along with a pre-determined system of an average size. A consumer is then enabled to 'drag and drop' solar panels, and in some embodiments other components, on and off of the displayed image. Some embodiments of the invention enable a consumer to scale the system up and down in size using a mouse, keyboard or other input device. Such embodiments enable consumers to increase and decrease the size of the system to suit the consumer's aesthetic and economic preferences. Some embodiments of the invention automatically adjust in real-time the on-screen display of the package information including cost, economic and environmental outputs in accordance with each 'drag and drop' adjustment.

In that manner embodiments of the invention enable a consumer to engineer a custom solar system remotely. An energy specification subsystem 300 is coupled to package analysis module 2487 and to an image analyzer system 2490. Image analyzer system 2490 is coupled to a source 2409 of images 2453, 2454. A model storage unit 2491 is coupled to package analyzer 2487. Model storage unit 2491 stores reference packages comprising, for example, packages comprising a variety of predetermined package configurations including commonly used component sizes.

Package analyzer 2487 is coupled to an energy components database 2405. Energy components database 2405 stores specifications, including cost of energy system components. An example energy system component specification is illustrated at 2493. Package information comprising information related to components selected to comprise a package is provided from energy components database 2405 to package manager unit 2488. Package manager unit 2488 stores package information in a package information storage unit 2497. According to one embodiment of the invention package information storage unit 2497 stores images and package information related to package components. Package view unit 2487 provides images of assembled packages for display as purchase options on display device 2408 of system 2406 to user 2407.

Figure 22:
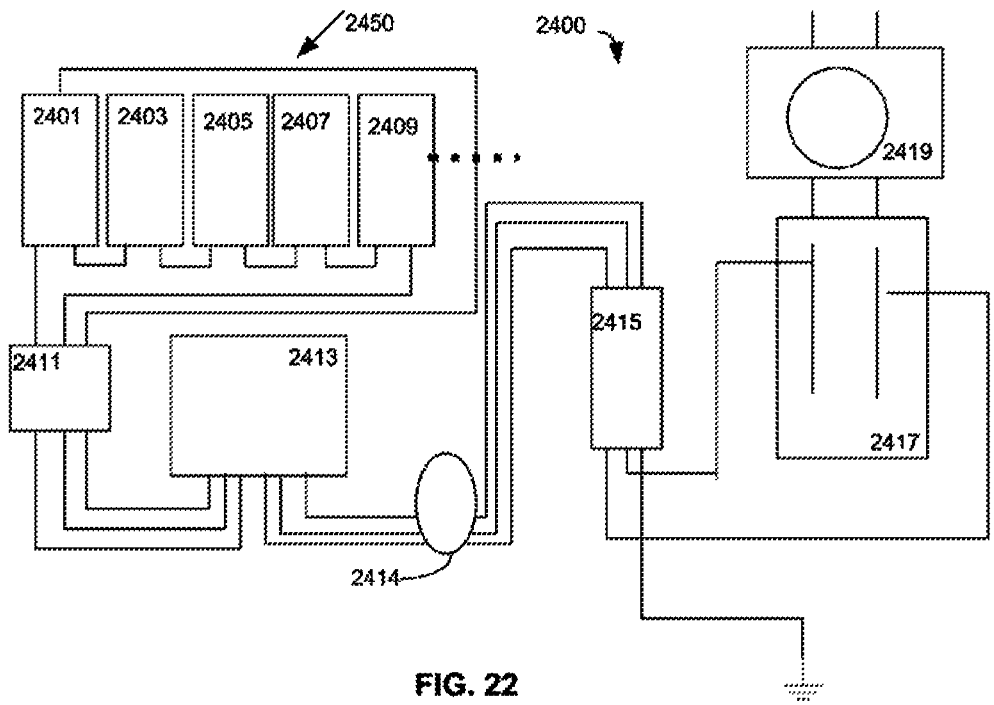
FIG. 22 is a block diagram of an example solar energy system including system components according to an embodiment of the invention.

As illustrated in FIG. 22 systems and methods of the invention provide a displayed image 2503 of a customer engineered solar PV system 2450 as the system appears on the customer's roof 600. In one embodiment of the invention, user selectable packages 2501 are displayed with the image of the customer's roof. Selection of a package option will cause the displayed image of the customer's roof to change the solar PV system image to correspond to a selected package.

In one embodiment of the invention a quote for the displayed system is provided in association with the image of the system. According to some embodiments of the inventions the system also displays economics and environmental information about a selected package option. Economic and environmental information include such factors as: energy produced, cost of the system and rebate, electricity cost reduction, payback period, CO2 tons avoided, etc. In one embodiment of the invention economic and environmental information is displayed on-screen with the selectable package configurations illustrated at 2501 in FIG. 23. Embodiments of the invention are configured to communicate with databases, for example databases of third-party data providers, comprising electricity data, solar output data, geographic photographic data, and subsidy data. Accordingly the invention provides a comprehensive online solution for consumers interested in investigating the benefits of a solar PV system.

In one embodiment of the invention, user interface module 2460 of system 2400 illustrated in FIG. 24 communicates with user system 2406 via a communications link such as the Internet to receive user provided information. The user provided information includes a location of a site to be provisioned with an energy system. The location information is provided to a package analyzer 2487. Also provided to package analyzer 2487 is an energy system specification for the site at the location provided by user 2407.

In some embodiments of the invention sizing subsystem 200 (illustrated in FIG. 5 at 500) receives energy consumption data related to the user specified location, from a source of energy consumption data 117. According to some embodiments of the invention sizing module 200 receives user provided system criteria information from user system 106, for example, a percentage of total energy user 2407 desires to supply using a solar energy system. Based on the information about energy consumption received from database 117 and the desired energy production of a solar energy system as indicated by user 2407, and further on the energy specification provided by energy specification subsystem 300, package analyzer 2487 determines at least one package comprising components matching the criteria as closely as possible.

Figure 26:
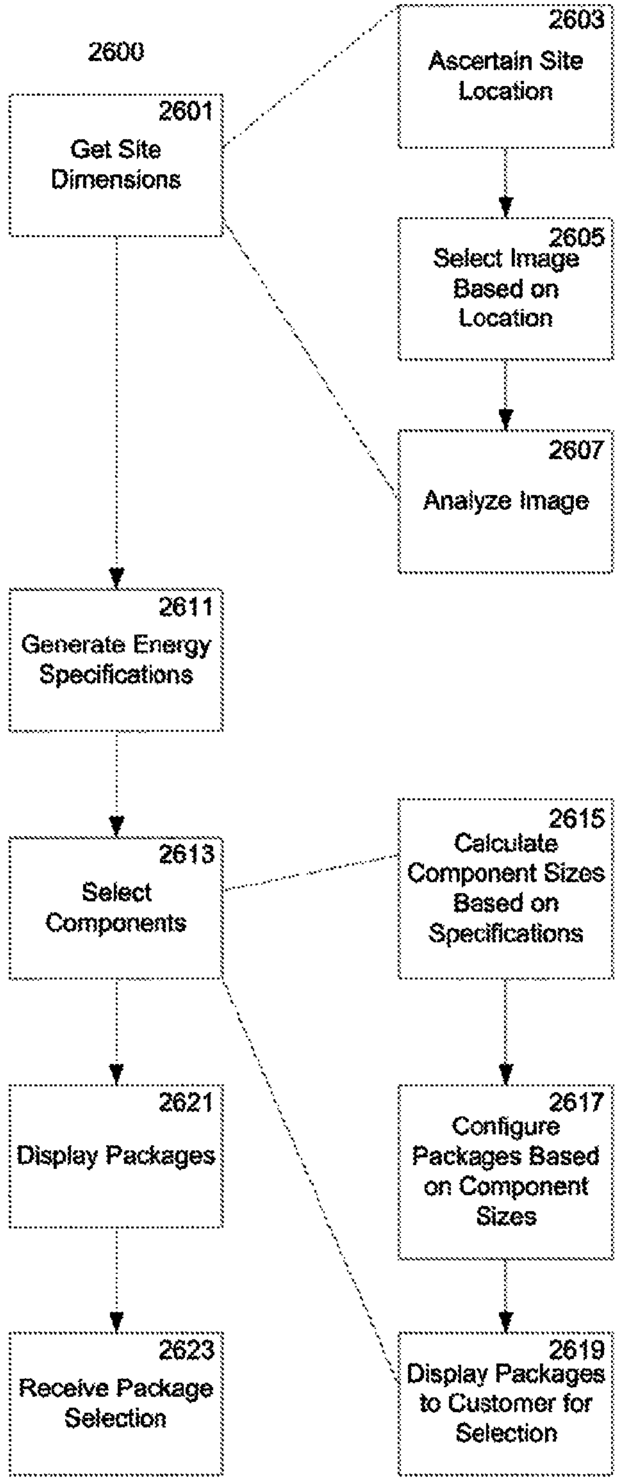
FIG. 26 is a flowchart illustrating steps of a method for configuring component packages according to an embodiment of the invention.

FIG. 26 illustrates steps of a method for quoting energy systems according to an embodiment of the invention. At step 2601 site dimensions are received, for example, from a sizing subsystem such as subsystem 500 illustrated in FIG. 1. At step 2611 energy specifications are generated for the site based on the site dimensions. The specifications are generated, for example, by an energy system specification generator such as generator 2300 illustrated in FIG. 24. At step 2613 components are automatically selected from a component database based on the site dimensions and the energy system specifications. In cases where a plurality of possible component configurations are suitable for meeting an energy system specification, a plurality of package options comprising various arrangements of suitable energy system components are determined. The package options are displayed on a display device of potential system buyer at step 2621.

At step 2623 a package selection is received from a potential system buyer indicating one of the plurality of displayed packages. Once a package selection is received systems and methods of the invention display information about the selected package including, for example, cost and energy savings. In one embodiment of the invention the step of obtaining site dimensions at 2601 is carried out by receiving information about the site location at step 2603. At step 2605 an image is selected, for example, from a source of geographical images. The selected image is analyzed at step 2607 to determine site dimensions.

According to one embodiment of the invention the step 2613 of selecting components to comprise a package is carried out by calculating component sizes based on system specifications at step 2615. Packages are configured based on the calculated component sizes at step 2617. The packages are displayed to a customer at step 2619.

A package manager unit 2488 receives package information from package analysis unit 2487 and stores the information in package information storage 2497. Package manager unit 2488 receives package selection and other information from user 2407 via GUI 2460. In one embodiment of the invention package manager unit 2488 provides package views to a user 2407 while enabling user 2407 to interact with package manager 2497 to customize a system to the user's preferences.

In one embodiment of the invention economic and environmental information is provided to a display screen, 2408 of user system 2406. The information is displayed in a first portion of display screen 2408 while information related to suitable packages is displayed in a second portion of display screen 2408.

Embodiments of the invention are configured to communicate with databases, for example databases of third-party data providers, comprising electricity data, solar output data, geographic photographic data, and subsidy data. Accordingly the invention provides a comprehensive online solution for users to investigate the benefits of an energy system.

One embodiment of the invention remotely determines the feasibility of installing a solar energy system as a preliminary step to configuring a package. One embodiment of the invention automatically considers site access and other engineering issues in assessing feasibility. One embodiment of the invention remotely determines the presence of shading objects above a given angel of incidence and accounts for these objects in determining feasibility and in selecting package components. One embodiment of the invention automatically selects the optimal roof and roof portions upon which to locate PV panels for optimal photovoltaic performance. One embodiment of the invention determines a maximum system size that can be configured to fit on an optimal roof area.

Figure 30:
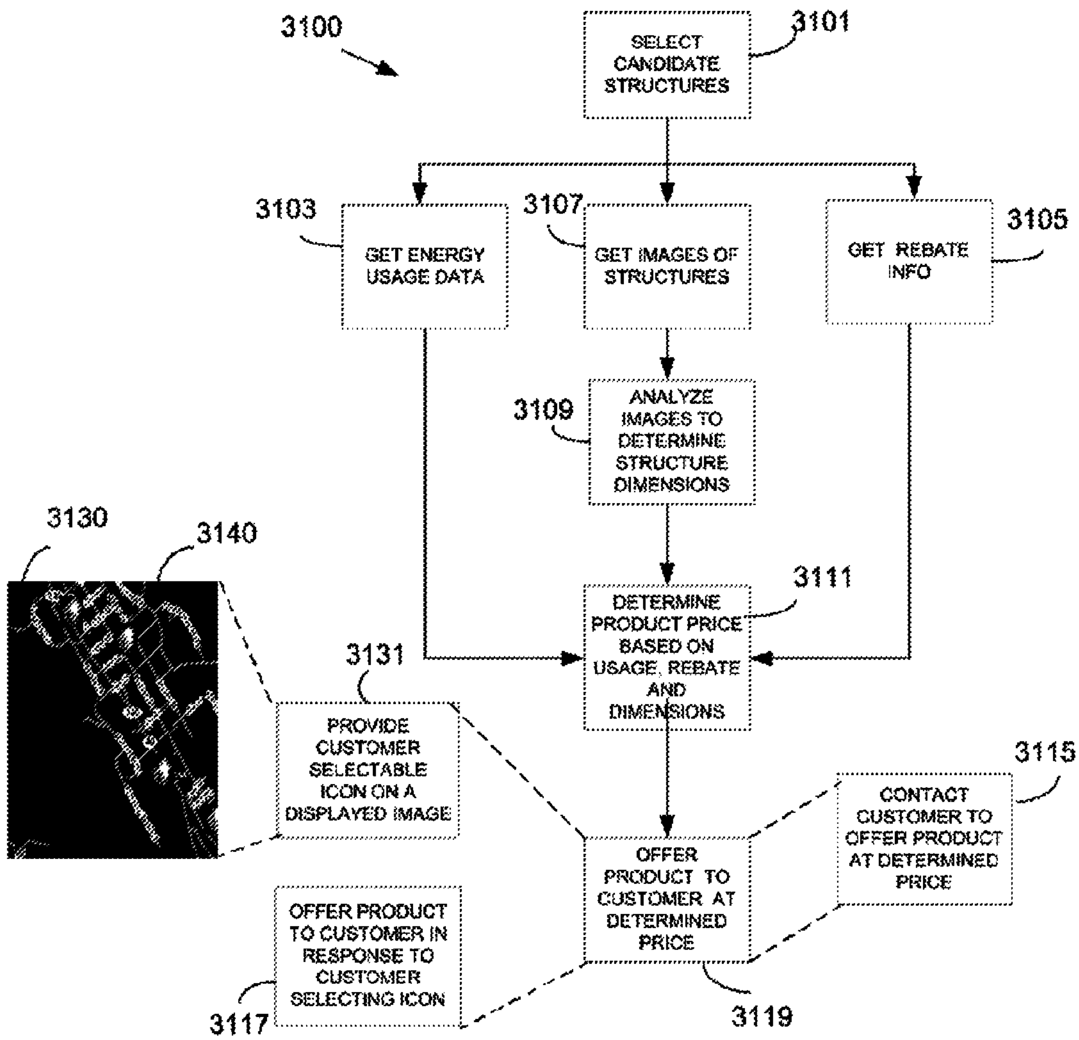
FIG. 30 is a flowchart illustrating steps of a method for providing quotes for energy systems according to an embodiment of the invention.

FIG. 30 illustrates steps of a method for providing a quote to a potentially purchaser of an energy system according to one embodiment of the invention. at step 3101 candidate structures are selected for installation of solar energy system packages. for each candidate structure energy usage data is determined at step 3103. For each candidate structure an image of the structure is obtained at step 3101. Also for each structure, rebate information is obtained at step 3105.

At step 3109 the images are analyzed to determine structure dimensions such as surface area and pitch. The dimensions are used in calculating the size of components to comprise an energy system for the structure. At step 3119 a system is offered to a customer for a candidate structure. In one embodiment of the invention a system offer is displayed on a display device for viewing by a customer. A selectable icon is provided enabling the customer to select the displayed offer for purchase at 3117. In one embodiment of the invention the customer is contacted to offer the system for a candidate structure at an automatically determined price.

In one embodiment of the invention the displayed offer includes information about the offered system package or packages. Information is selected from a variety of information types, for example, information may include indications of a cost of a package and indications of energy savings expected to be realized by a particular offer.

Alternative Sizing Example

FIG. 31

Figure 31:
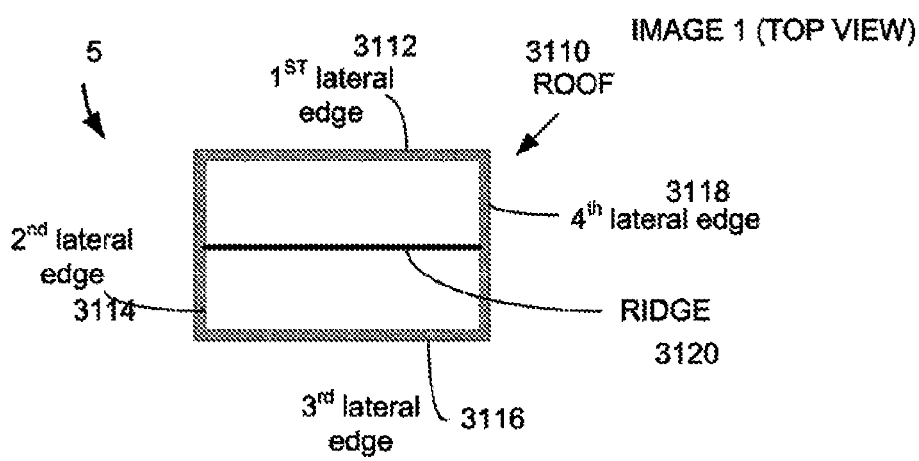
FIG. 31 is a top plan view of a house including a roof to be sized.

FIG. 31 illustrates an embodiment of the roof sizing 1107 tool described above with respect to FIGS. 15-19. FIG. 31 is a top plan view of a roof 3110 of a structure 5 (not visible) as the structure appears displayed on a display screen of a computer system according to an embodiment of the invention. In the example shown, the roof 3110 is to be sized for installation of solar panels. The roof 3110 is defined by four lateral side edges 3112, 3114, 3116 and 3118, and a ridge 3120. According to one embodiment of the invention structure 5 is one of a plurality of structures within a single geographic region or example, a plurality of homes within a block or neighborhood. In one embodiment of the invention the top view image is obtained by downloading the image from a geophysical information service (GIS) such as provided by Microsoft, Google, or any of a number of other commercially available databases.

FIG. 32

Figure 32:
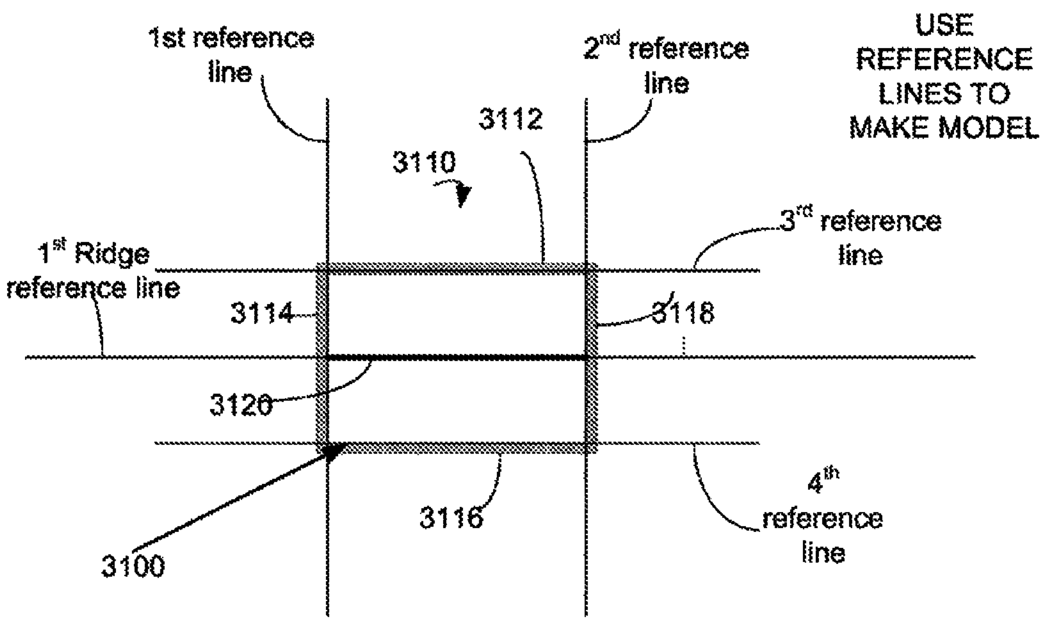
FIG. 32 illustrates reference lines positioned with respect to the roof illustrated in FIG. 1 for generating a model of the roof in accordance with an embodiment of the invention.

FIG. 32 illustrates a graphical user interface (GUI) for sizing the roof illustrated in FIG. 31. The sizing GUI includes first, second, third and fourth reference lines. The first, second, third and fourth reference lines are displayed on a display device. The display device is operably coupled to a processor such as a personal computer programmed to enable a computer user to move the first, second third and fourth reference lines using a mouse, trackball or other positioning device.

In operation the user positions the first, second, third and fourth reference lines such that each reference line aligns with a corresponding lateral side edge 3112, 3114, 3116 and 3118. In that manner a rectangle representing the shape of the roof to be sized is defined by the intersection of the reference lines. A first ridge reference line is positioned by the user to align with a ridge 20 of the roof to be sized. The rectangle and the first ridge reference line comprise a model 31100 of the roof to be sized. The model is saved and applied to different images of the same roof as part of a sizing method of an embodiment of the invention.

FIG. 33

Figure 33:
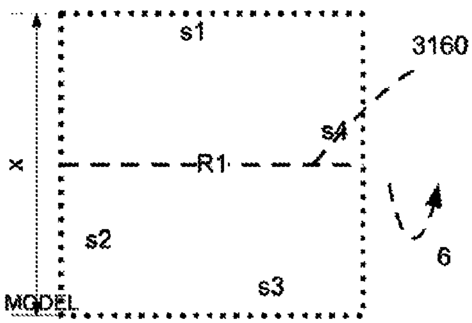
FIG. 33 illustrates a model defined by positioning the reference lines illustrated in FIG. 32 in accordance with an embodiment of the invention.

FIG. 33 illustrates model 31100 comprising four sides S1-S4 and a first ridge R1. Arrows 6 and 7 indicate translation and rotation of the model in accordance with an embodiment of the invention. In other words, the invention enables a user to manipulate the model by translation and rotation while preserving the geometric relationship between the sides and ridge. For example side s2 has a length dimension x whose value is retained during any translation or rotation of the model by a user. The model is represented in two dimensions and thus serves as a "base" reference during the sizing process.

FIG. 34

Figure 34:
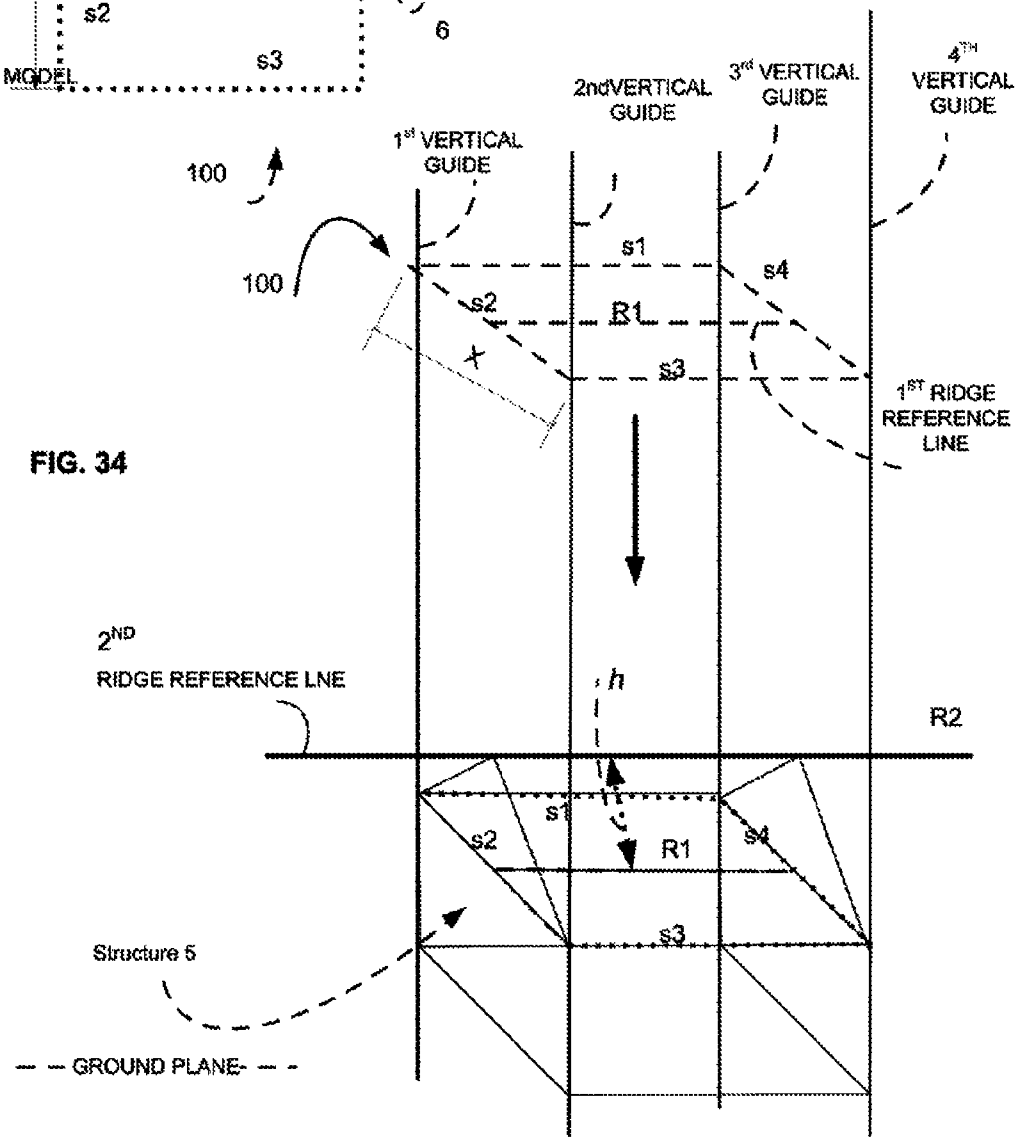
FIG. 34 illustrates a perspective view of a structure including a roof to be sized and further illustrating translation and rotation of the model of FIG. 3 to align the model to the perspective view of the same roof in accordance with an embodiment of the invention.

FIG. 34 illustrates a perspective view, i.e., an oblique view, of a structure 5 including the roof illustrated in FIGS. 32-33 above. The model 31100 is rotatable and translatable by the user operating model interface controls (example illustrated in FIG. 36). A user manipulates model 31100 to align at least two side edges of the model with at least two corresponding lateral sides of the roof structure. When the model is aligned a second ridge R2 is defined aligning a reference line with the $2^{nd}$ reference ridge as illustrated in FIG. 34. The separation of the first and second ridges after aligning the model to the roof is represented by h in FIG. 34.

Thus, by positioning the model with respect to the perspective view of the roof, the user is able to determine the height of the ridge above the baseline of the roof. The length of a side perpendicular to the ridge line, for example side s2, is known from the previous step of generating the model by forming a rectangle using reference lines. Since the height and span (for example, length of side s2) of the roof are known, the roof pitch can be automatically calculated.

FIG. 35

Figure 35:
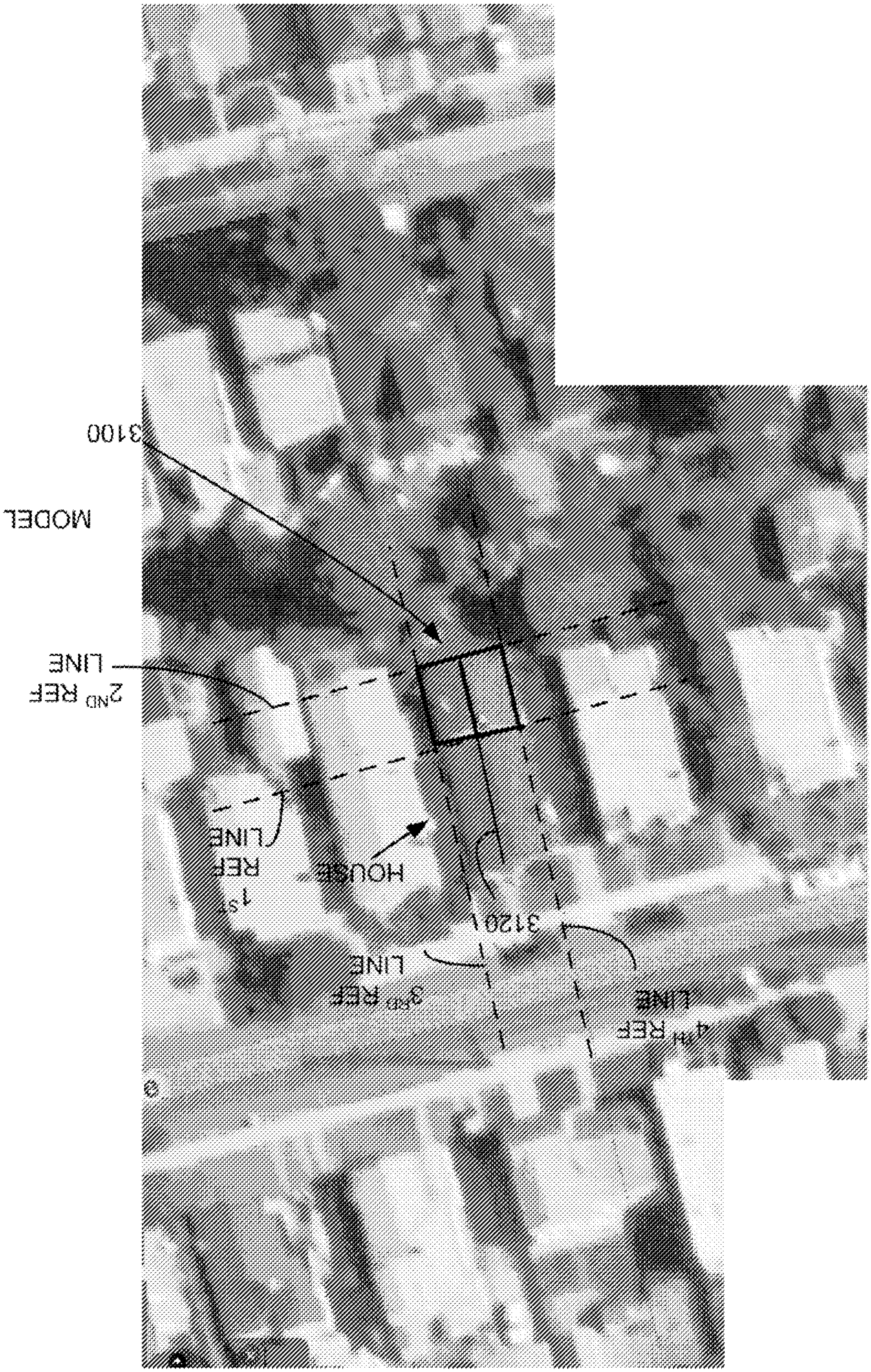
FIG. 35 illustrates a top plan view of a roof to be sized as the roof appears in an image obtained from a geographical information service (GIS) and further illustrating reference lines for generating a model in accordance with an embodiment of the invention.

FIG. 35 illustrates a top plan view of a roof to be sized as the roof appears in an image obtained from a geographical information service (GIS). In one embodiment of the invention the image file obtained from the GIS is adapted to include information about the scale of the image. In one embodiment of the invention image metadata is transmitted with the image. The image metadata includes scale information for the image. In another embodiment of the invention the image file is adapted to include information about the exterior orientation of the camera capturing the image, and defines its location in space and its view direction. In another embodiment of the invention, the inner orientation defines the geometric parameters of the imaging process. This is primarily the focal length of the lens, but can also include the description of lens distortions. Further additional observations play an important role: With scale bars, basically a known distance of two points in space, or known fix points, the connection to the basic measuring units is created. FIG. 35 further illustrates first, second third and fourth reference lines as well as vertical reference lines as they appear comprising a graphical user interface according to an embodiment of the invention.

FIG. 36

Figure 36:
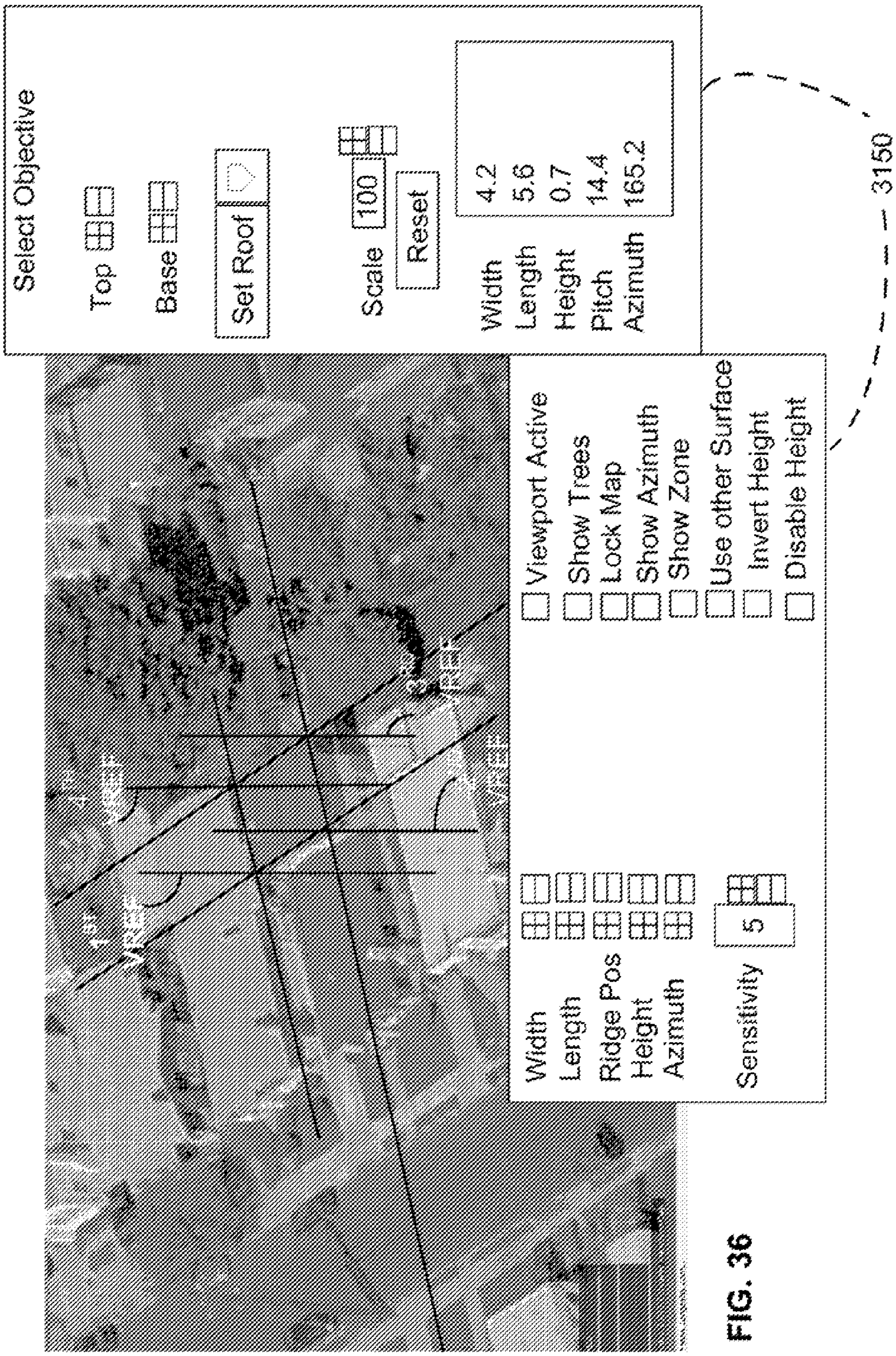
FIG. 36 is a perspective view of the roof of the image of FIG. 35 and illustrating vertical reference lines in accordance with an embodiment of the invention.

FIG. 36 is an image providing a perspective view of the roof of the image of FIG. 35 and illustrating vertical reference lines in accordance with an embodiment of the invention.

FIG. 37

Figure 37:
FIG. 37 is a second perspective view of the roof illustrated in FIGS. 35 and 36.
Figure 38:
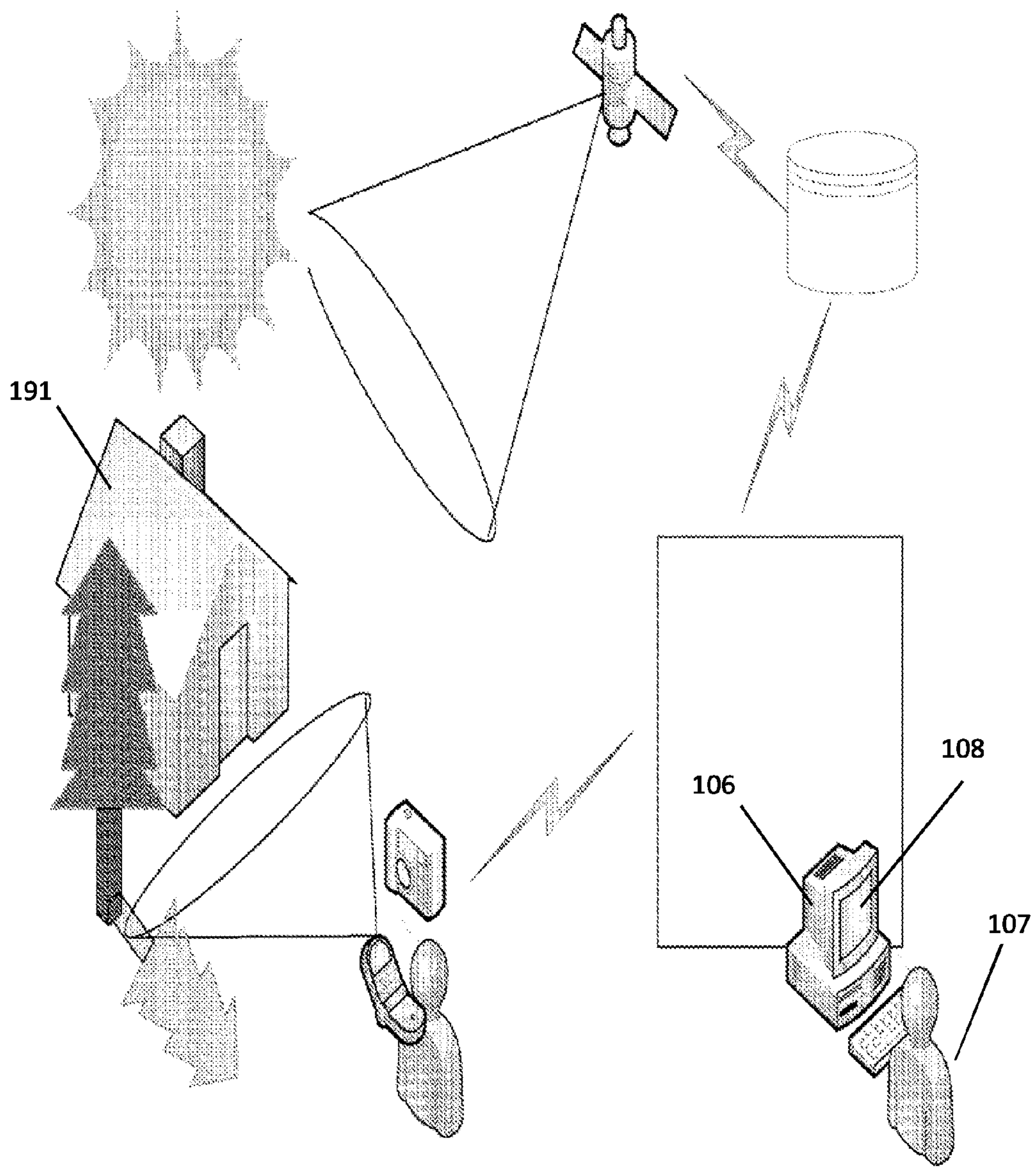
FIG. 38 Illustrates an information network, transmitting image data of a structure from a satellite through a GIS (geographical information service) and/or land based cameras to a central computer terminal.

FIG. 37 is a second perspective view of the roof illustrated in FIGS. 35 and 36. According to some embodiments of the invention a plurality of different perspective views are obtained. A model obtained using a top plan view is used on each perspective view to size the roof. The greater the number of perspective views used to obtain roof pitch information, the more accurate the resulting measurement of roof pitch.

There have thus been provided new and improved methods and systems for provisioning a solar energy system. While the invention has been shown and described with respect to particular embodiments, it is not thus limited. Numerous modifications, changes and enhancements will now be apparent to the reader. All of these variations remain within the spirit and scope of the invention.

We claim:

1. A computing system for generating a roof estimate report, the computing system comprising:

a memory;

a roof estimation module that is stored on the memory and that is configured, when executed, to:

receive a first and a second aerial image of a building having a roof, each of the aerial images providing a different view of the roof of the building;

correlate the first aerial image with the second aerial image;

generate, based at least in part on the correlation between the first and second aerial images, a three-dimensional model of the roof that includes a plurality of planar roof sections that each have a corresponding slope, area, and edges; and generate and transmit a roof estimate report that includes one or more top plan views of the three-dimensional model annotated with numerical values that indicate the corresponding slope, area, and length of edges of at least some of the plurality of planar roof sections.

2. The computing system of claim 1 wherein the roof estimation module is further configured to correlate the first and second aerial images by receiving an indication of one or more corresponding points on the building shown in each of the first and second aerial images.

3. A system for remotely determining measurements of a roof, comprising: a computer including an input means, a display means and a non-transitory memory; and a roof estimation software program stored in the non-transitory memory and operable to cause a processor of the computer to: receive location information of a building in a selected region; receive image files representing a plurality of distinct roof sections of a roof of said building; determine, measurements of the roof including size, dimensions, and pitch of the plurality of distinct roof sections of the roof of said building based solely on the received image files; and outputting a report having the determined measurements therein.

4. A method for remotely determining measurements of a roof comprising:

receiving image files of at least a portion of a roof;

determining, by a computer system, roof pitch measurements by constructing a three-dimensional geometry of the roof based solely on the received image files;

determining roof pitch measurements based on the three dimensional geometry;

and providing a roof report based on the roof pitch measurements.

* * * * *